(12) United States Patent
Connors

(10) Patent No.: US 7,987,126 B2
(45) Date of Patent: Jul. 26, 2011

(54) INTEREST RATE SWAP INDEX

(75) Inventor: Clive Connors, Venice, FL (US)

(73) Assignee: Pipeline Capital, Inc., Venice, FL (US)

( * ) Notice: Subject to any disclaimer, the term of this patent is extended or adjusted under 35 U.S.C. 154(b) by 59 days.

(21) Appl. No.: 11/870,083

(22) Filed: Oct. 10, 2007

(65) Prior Publication Data

US 2008/0249956 A1    Oct. 9, 2008

Related U.S. Application Data

(63) Continuation-in-part of application No. PCT/US2007/073775, filed on Jul. 18, 2007.

(60) Provisional application No. 60/807,674, filed on Jul. 18, 2006.

(51) Int. Cl.
*G06Q 40/00* (2006.01)

(52) U.S. Cl. ......................................................... 705/35

(58) Field of Classification Search .................... None
See application file for complete search history.

(56) References Cited

U.S. PATENT DOCUMENTS

| | | | |
|---|---|---|---|
| 5,946,667 A | 8/1999 | Tull, Jr. | |
| 5,987,435 A | 11/1999 | Weiss et al. | |
| 6,304,858 B1* | 10/2001 | Mosler et al. | 705/37 |
| 6,321,212 B1* | 11/2001 | Lange | 705/36 R |
| 6,456,982 B1* | 9/2002 | Pilipovic | 705/36 R |
| 6,754,639 B2 | 6/2004 | Ginsberg | |
| 7,225,153 B2* | 5/2007 | Lange | 705/37 |
| 7,340,427 B1* | 3/2008 | Cornell | 705/37 |
| 7,499,881 B2* | 3/2009 | Henninger et al. | 705/36 R |
| 7,567,928 B1* | 7/2009 | Oaten et al. | 705/35 |
| 7,577,601 B1* | 8/2009 | Rademacher et al. | 705/35 |
| 7,603,310 B2* | 10/2009 | Dinc et al. | 705/37 |
| 2002/0010670 A1* | 1/2002 | Mosler et al. | 705/37 |
| 2002/0107774 A1* | 8/2002 | Henninger et al. | 705/37 |
| 2002/0116317 A1* | 8/2002 | May | 705/37 |
| 2003/0023539 A1* | 1/2003 | Wilce et al. | 705/37 |
| 2003/0083978 A1* | 5/2003 | Brouwer | 705/37 |
| 2003/0144947 A1* | 7/2003 | Payne | 705/37 |

(Continued)

OTHER PUBLICATIONS

Accounting for Derivatives: The Case of a Currency Rate Swap used to Hedge Foreign Exchange Rate Exposure by Douglas C. Cerf and Fredrick J. Elmy, Issues in Accounting Education, Nov. 1998, pp. 931-956 (18 pages).*

(Continued)

*Primary Examiner* — Alexander Kalinowski
*Assistant Examiner* — Bruce I Ebersman
(74) *Attorney, Agent, or Firm* — Michael P. Kenney

(57) ABSTRACT

A set of indices is provided which allows accurate tracking of interest rate swap (IRS) markets. The indices are calculated using market data and synthetic purchasing and selling of synthetic interest rate swaps utilizing the present market data. The value of the synthetic interest rate swaps are the basis for the value of a particular index. The purchasing and selling of the synthetic interest rate swap occurs at a frequency to minimize effects of shortening terms on the index. One subset of the IRS indices reflects a plain-vanilla swap for a specific term of years. Another subset of the IRS indices reflects a spread between two specific terms of years. A third subset of the IRS indices reflect two spreads, sometimes referred to as a butterfly, between a middle term of years and a shorter term of years and the same middle term of years and a longer term of years.

21 Claims, 3 Drawing Sheets

U.S. PATENT DOCUMENTS

| | | | | |
|---|---|---|---|---|
| 2004/0111358 A1* | 6/2004 | Lange et al. | | 705/37 |
| 2005/0080734 A1* | 4/2005 | Lynch et al. | | 705/40 |
| 2006/0224493 A1* | 10/2006 | Pinkava | | 705/37 |
| 2006/0224494 A1* | 10/2006 | Pinkava | | 705/37 |
| 2006/0253360 A1* | 11/2006 | Gould | | 705/35 |
| 2007/0055609 A1* | 3/2007 | Whitehurst et al. | | 705/37 |
| 2007/0239589 A1* | 10/2007 | Wilson et al. | | 705/37 |
| 2007/0288351 A1* | 12/2007 | Huntley | | 705/37 |

OTHER PUBLICATIONS

Attacks on Derivative Use At GSE's Called a Bum Rap. American Banker, Feb. 27, 2002, by Tommy Fernandez, 2 pages.*

The Controversy over Stock Options, (expensing stock options supported by Financial Accounting Standards Board and Internation, Connie Esmond-Kiger and Ray Stevens, Entrepreneur Jul.-Aug. 2003.*

Dayton, Steven J., Interest Rate Swap Futures, dated Aug. 1, 2007, Published on website Chicago Board of Trade.

CME Group to Offer Treasury and Interest Rate Swap Spreads, PR Newswire, Jun. 19, 2008 (http://findarticles.com/p/articles/mi_m4PRN/is_2008_June_19/ai_n27499265/).

Connors, Clive et al., Product Specification, FTSE MTIRS Index Series, US Dollar Indices—Constituents, Aug. 2006.

Connors, Clive et al., Product Specification, FTSE MTIRS Index Series, US Dollar Indices—History, Aug. 2006.

Connors, Clive et al., Ground Rules for the Management of the FTSE MTIRS Index Series, Version 1.0 Aug. 2006.

Connors, Clive et al., Product Specification FTSE MTIRS Index Series US Dollar Indices—Valuation, Aug. 2006.

Introduction of Three Month Eonia Swap Index Futures Contract (Exchange Contract No. 73), May 14, 2008.

Liv Dinkin et al., The Lehman Brothers Swap Indices, Jan. 2002, Lehman Brothers, Inc.

\* cited by examiner

INTEREST RATE SWAP INDEX

This application is a continuation-in-part application claiming priority to PCT International Patent Application No. PCT/US07/73775, filed Jul. 18, 2007, which designates the United States of America and which claims the benefit of U.S. Provisional Patent Application Ser. No. 60/807,674, filed Jul. 18, 2006.

BACKGROUND OF INVENTION

A derivative is an investment, often in the form of a financial instrument such as an agreement representing shares, from which payoffs over time are derived from the performance of assets (such as commodities, shares or bonds), interest rates, exchange rates or indices (such as a stock market index, consumer price index (CPI) or an index of weather conditions). The performance of the asset, interest rate, exchange rate or index can determine the amount or timing of the payoffs, or both. All details regarding the amount and timing of the payoff as well as the underlying assets, i.e. the value of the financial instrument, are subject to an agreement defining these details. Portions of the agreement apply to all financial instruments issued thereunder while portions of the agreement specific to the particular financial instrument, i.e. number of shares and beginning value of the underlying asset, are fully defined in the financial instrument. The main types of derivatives are futures, forwards, options and swaps. A swap is where a first party exchanges their future cash flow for the future cash flow of a second party.

In the field of derivatives, a popular form of swap is the interest rate swap ("IRS"), in which one party exchanges a stream of interest for another party's interest stream. IRSs are normally 'fixed against floating', i.e. the first party exchanges cash flow related to a loan made at a fixed interest rate for cash flow to a second party related to a loan at a variable rate of interest. IRSs can also be 'fixed against fixed' or 'floating against floating' rate swaps. The IRS agreement is entered into between two counterparties under which each agrees to make periodic payment to the other for an agreed period of time based upon a notional amount of principal. The principal amount is notional because there is no need to exchange actual amounts of principal in a single currency transaction. A notional amount of principal is required in order to compute the actual cash amounts that will be periodically exchanged.

IRSs are often used by companies to alter their exposure to interest-rate fluctuations, by swapping fixed-rate obligations for floating rate obligations, or swapping floating rate obligations for fixed-rate obligations. By swapping interest rates, a company is able to synthetically alter their interest rate exposures and bring them in line with management's appetite for interest rate risk.

Usually, one "leg" of an IRS involves quantities that are known in advance, known as the "fixed leg", the other leg involves quantities that are not known in advance, known as the "floating leg". The floating leg, i.e. the floating interest rate obligation, must therefore be "reset" against an agreed reference rate, which will become known at some point before payment or settlement takes place. For instance the parties might agree to pay 50 basis points (0.5%) over the LIBOR measured on the 1st trading day of every 3rd month. The payment schedule is often, but not always, timed to coincide with the resets. London Interbank Offered Rate ("LIBOR") is a reference rate that varies daily based on the interest rates at which banks offer to lend unsecured funds to other banks in the London wholesale (or "interbank") money market. Ideally, the determination of the reference rate must be outside the control of the counterparties, otherwise a conflict of interest will arise. Typically, the reference rate is some figure made publicly available by a third party information vendor, or by government agencies, e.g. LIBOR. Once a component of the floating leg is fixed (or "reset"), the fixed and floating components can be swapped or settled (typically one or two days after the fixing date).

Party F (for "fixed rate") holds a fixed-rate loan, party V (for "variable rate") holds a variable-rate loan. In a swap, F will make the payments on V's loan and vice versa. There is no change in the balance sheets of either party, because the principal, i.e. the underlying 'notional' amounts, offset one another and stay where they were. In other words, what is called a $1 billion swap typically involves amounts much smaller than $1 billion. Thus, Party V agrees to pay Party F periodic interest rate payments of LIBOR+50 bps (bps=basis points=0.01%) in exchange Party F agrees to pay Party V periodic interest rate payments fixed at 3.00%. Note that there is no exchange of the principal amounts and that the interest rates are on a "notional" (i.e. imaginary) principal amount. Also note that the interest payments are settled in net. Thus, if LIBOR is 1.20% when payments are due then LIBOR+50 bps=1.70%; the fixed rate of 3.00% less this 1.70% means that Party V receives the 'net' of 1.30%. The fixed rate (3.00% in this example) is referred to as the swap rate. If the underlying notional amount were $1 billion and the revenue flow is calculated once annually, Party F would owe Party V $13,000,000. In the same example, if the net payment for the swap were calculated quarterly then Party F would owe Party V $3,250,000. This is because the interest rate is annualized and the term is one quarter of the year.

Trading an IRS is one of the more common forms of over-the-counter derivatives. It is the most widely used derivative in terms of its outstanding notional amount, but it is not standardized enough and does not have the properties to easily change hands in a way that will let it be traded through a futures exchange like an option or a futures contract. That is, even though the term 'plain vanilla' can be applied to the swap, variables in any given swap are different enough that standardization is very difficult. Such variables include the notional amount, the variable rate, the fixed rate, the swap/credit spread, the term (in years), risk of nonpayment by any single participant, currency etc. Thus, the liquidity of even the plainest of plain vanilla swaps is low.

The present value of a plain vanilla (i.e. straightforward) swap can be computed using standard methods of determining the present value of the components. Two things should be kept in mind when thinking about the 'value' of a particular swap. First, when the swap is entered into the value of the swap to either party is typically zero. That is, the fixed and/or variable interest rate is 'set' (taking all publicly available information into account), e.g. by varying the fixed rate or the bps added to LIBOR, such that the cash flow from F to V is equal to the cash flow from V to F for the entire term of the swap. A party is not going to enter into a swap such that the future value of the swap starts out as a liability. One exception is where Party F pays Party V to enter into a swap that is a liability, i.e. has a negative present value, to Party V. The payment from party F to party V is precisely the same as the liability of the swap to Party V. Second, some variability is going to be introduced over the life of the swap. Typically, this variability comes in the form of one leg of the swap being subject to a variable interest rate. Thus, the series of payments based on variable rates, from Party V, are determined at the agreed dates of each payment.

The most obvious difficulty to be overcome in attaching a present value to a swap would seem to be the fact that the future stream of floating rate payments is unknown. At the time the swap is entered into, only the actual payment rates of the fixed leg are known in the future. This is literally true because it is not known with certainty what the 6 month US dollar LIBOR rate will be in 12 months time or 18 months time. However, markets possess a considerable body of information about the relationship between interest rates and future periods of time. An estimation of the future rates affecting the floating leg can be derived from the yield curve, to be further discussed below.

There is a large and liquid market in interest bearing securities issued by governments. Liquid means that the price of a security is well known to all market participants and, thus, it is typically very easy to convert a "liquid" financial instrument into cash or vice versa by buying or selling that instrument. These securities pay interest on a periodic basis and are issued with a wide range of maturities. Principal on these government securities is repaid only at maturity and at any given point in time the market values these securities to yield whatever rate of interest is necessary to make the securities trade at their par value. It is possible, therefore, to plot a graph of the yields of such securities vs. their varying maturities. This graph is known generally as a yield curve, i.e. the relationship between future interest rates and time.

The classic example of a yield curve is the US Treasury yield curve, an example of which is shown in FIG. 1. Thus, yield curve 1 discloses that, at a particular point in time for which yield curve 1 is applicable, a 5 year U.S. government bond had a yield of approximately 4% and a 20 year bond had a yield of approximately 4.5%. For example, at a certain time of a particular day in November, 2005, all of the available data put together revealed that the 'market' believed that the yield of a 5 year U.S. bond was 4% and the yield of a 20 year U.S. bond was 4.5%. All of this data regarding the market was compiled in yield curve 1.

Another government security is the zero coupon bond. The zero coupon bond does not pay interest at periodic intervals. Instead it is issued at a discount from its par or face value but is redeemed at par, the accumulated discount which is then repaid representing compounded or "rolled-up" interest. A graph of the internal rate of return (IRR) of zero coupon bonds over a range of maturities is known as the zero coupon yield curve 2 in FIG. 2. FIG. 2 also shows the par yield curve 3.

Finally, at any time the market is prepared to quote an investor forward interest rates. If an investor wishes to place a sum of money on deposit for six months and reinvest that money after maturity for a further six months, then the market will quote today a rate at which the investor can re-invest his deposit in six months time. The six month forward deposit rate is not a 'guess'; it is a mathematically derived rate which reflects an arbitrage relationship between current (or spot) interest rates and forward interest rates, i.e. the six month forward interest rate is the rate of interest which eliminates any arbitrage profit. The forward interest rate will leave the investor indifferent as to whether he invests for six months and then re-invests for a further six months at the six month forward interest rate or whether he invests for a twelve month period at today's twelve month deposit rate. FIG. 3 shows an example of the forward curve 4. FIG. 3 also shows a zero coupon yield curve 5 and a par bond yield curve 6.

Thus, the market possesses sufficient information concerning the yield generated by existing instruments over future periods of time. The market has the ability to calculate forward interest rates which will eliminate arbitrage profit with spot interest rates. All of this information is available from publicly available sources. Future floating rates of interest can be calculated, therefore, using the forward yield curve.

This, however, is not sufficient to calculate the future payments due under the swap and, thus, the mark to market value of the swap at a given point in time.

As discussed above, the aggregate set of cashflows due under any swap is—at inception—zero. That is, the net present value of both the fixed rate stream of payments and the floating rate stream of payments in a fixed to floating IRS is zero and the net present value of the complete swap must be zero. Since the floating rate payments due under the swap can be calculated (as explained above) it follows that the fixed rate payments will be such that when they are deducted from the floating rate payments and the net cash flow for each period is discounted at the appropriate rate given by the zero coupon yield curve, the net present value of the swap will be zero. It might also be noted that the actual fixed rate produced by the above calculation represents the par coupon rate payable for that maturity if the stream of fixed rate payments due under the swap are viewed as being a hypothetical fixed rate security.

Each future variable rate payment is calculated using the forward rate, from the forward rate curve, for each respective payment date. A series of future cash flows is thus calculated. Each cash flow is discounted by the zero coupon rate for the date of the payment, calculated from the zero coupon yield curve data. Zero coupon rates are used because these rates are for bonds which pay only one cash flow. The IRS is therefore treated like a series of zero coupon bonds.

The fixed rate offered in the swap is the rate which values the fixed rate's payments at the same value as the variable rate payments using today's forward rates. Therefore, at the time the contract is entered into, there is no advantage to either party, and therefore the swap requires no upfront payment.

During the life of the swap the same valuation technique is used. Over time, many of the factors described above, including the yield curve, the zero coupon bond curve and the forward curve will have changed. In fact, these curves change continuously. Based on these changes, mark to market accounting for the swap will almost always reveal the swap to be an asset to one party and a liability to the other.

Reversing or terminating an IRS is often necessary or desirable. As discussed previously, the shape of the curves used to price the swap initially will change over time. We begin with the assumption that shortly after a swap there is an increase in forward interest rates, i.e. the forward yield curve steepens. Since the fixed rate payments due under the swap are fixed, this change in the prevailing interest rate environment will affect future payments made under the floating rate arm. This benefit will accrue to Party F and will represent a cost to the Party V. If the future net cash flows of the swap are computed from the latest forward yield curve and discounted at the appropriate new zero coupon rate for each future period, i.e. reflecting the current zero coupon yield curve, the positive net present value result reflects how the value of the swap to Party F has risen. Correspondingly, it demonstrates how the value of the swap to Party V has declined.

Using common financial terminology, this valuation of the swap may also be called "mark to market" of the IRS. If, having done this, the floating rate payer wishes to terminate the swap with the fixed rate payer's agreement, then the positive net present value ("mark to market") figure we have calculated represents the termination payment that will have to be paid to the fixed rate payer. Alternatively, if the floating rate payer wishes to cancel the swap by entering into a reverse swap with a new counterparty for the remaining term of the original swap, the net present value figure represents the payment that the floating rate payer will have to make to the new counterparty in order for him to enter into a swap which precisely mirrors the terms and conditions of the original swap.

Some basic reasons for swap transactions will now be discussed. A company with excellent credit will pay less to borrow money under identical terms than a less creditworthy company. The extra paid by the less creditworthy company is referred to as a "credit quality spread". This spread is typically greater in relation to fixed interest rate borrowings than it is for floating rate borrowings. This spread also typically increases with maturity. The swap party making fixed rate payments (Party F) in a swap is predominantly the less creditworthy participant. Companies can lower their costs of borrowing by using swaps in conjunction with credit quality spreads. IRSs are used by a wide range of banks, non-financial operating companies, insurance companies, mortgage companies, investment vehicles and trusts, government agencies and sovereign states for one or more of the following reasons: 1. To lower funding costs; 2. To hedge interest rate exposure; 3. To implement asset or liability management strategies; 4. To create types of investments not currently obtainable; 5. To obtain higher yields from investment assets; and 6. Speculation in relation to future movements in interest rates.

The advantages of IRSs include the following: 1. A floating-to-fixed swap increases the certainty of an Party V's future obligations; 2. swapping from fixed-to-floating rate may save Party V money if interest rates increase (conversely, if interest rates decrease, Party F will have the positive net cashflow); 3. swapping allows issuers to revise their debt profile to take advantage of current or expected future market conditions; and 4. IRSs are a financial tool that potentially can help issuers lower the amount of debt service.

Investors, for their own reasons, enter into transactions to buy or sell an IRS of a particular duration while simultaneously selling or buying an IRS of a longer duration. This activity, though of great value to the investor, is expensive as it includes IRS transaction brokerage fees and the IRS bid offer spread for two periods. Should that investor then wish to exit the trade, the same bid offer has to be crossed and transaction fees again paid. This method of trading is antiquated by nature if only by the exposure to losses in attempting to trade large amounts of two swap periods at the same time; as such, trades of this type lend themselves perfectly to an index eliminating such risks.

There is also a lack of a viable bench mark for which corporate bonds can be pegged. Although treasuries can be used, the spread activity is a more accurate barometer of interest movement when it comes to corporate lending.

To trade traditional IRS there are various costs incurred, including crossing the bid offer spread, cost of credit, and transaction/brokerage fees. In addition, unlike most notes or bonds where the maturity is fixed, the IRS market completes each transaction out of spot (2 working days forward of the trade date) and with the end date being the duration, i.e. 2, 5, 10, 30 years, should the trader wish to reverse her position at any time after the original trade date there is an obvious mismatch in the end date. This increases exposure and creates complications in back office management of positions which, in turn, increases possible trading errors. Should a trader wish to take advantage of the yield curve by executing 2 years and executing 10 years, in order to be properly duration weighted the trader has to complete a 2 year IRS having a notional amount of approximately $400 million for a notional amount of $100 million in the 10 year IRS. This creates liquidity risk because executing the required notional amount of 2 years is multiplicatively more difficult than executing the required notional amount of ten years. Liquidity risk as for instance should she trade the 10 year leg the subsequent volume required to complete the 2 year leg of the trade may not be available, or the reverse should she trade the 2 years once the volume is completed the 10 year price may have moved against the trader, both trading methods are cumbersome and can create unwanted positions these can be the most expensive of all costs associated with trading the IRS, as the traders options are limited to running the unwanted position in the hope that the curve trade can be completed or unwind the trade and cross the bid offer and absorb any price changes to reverse it.

SUMMARY OF THE INVENTION

Figure 1:
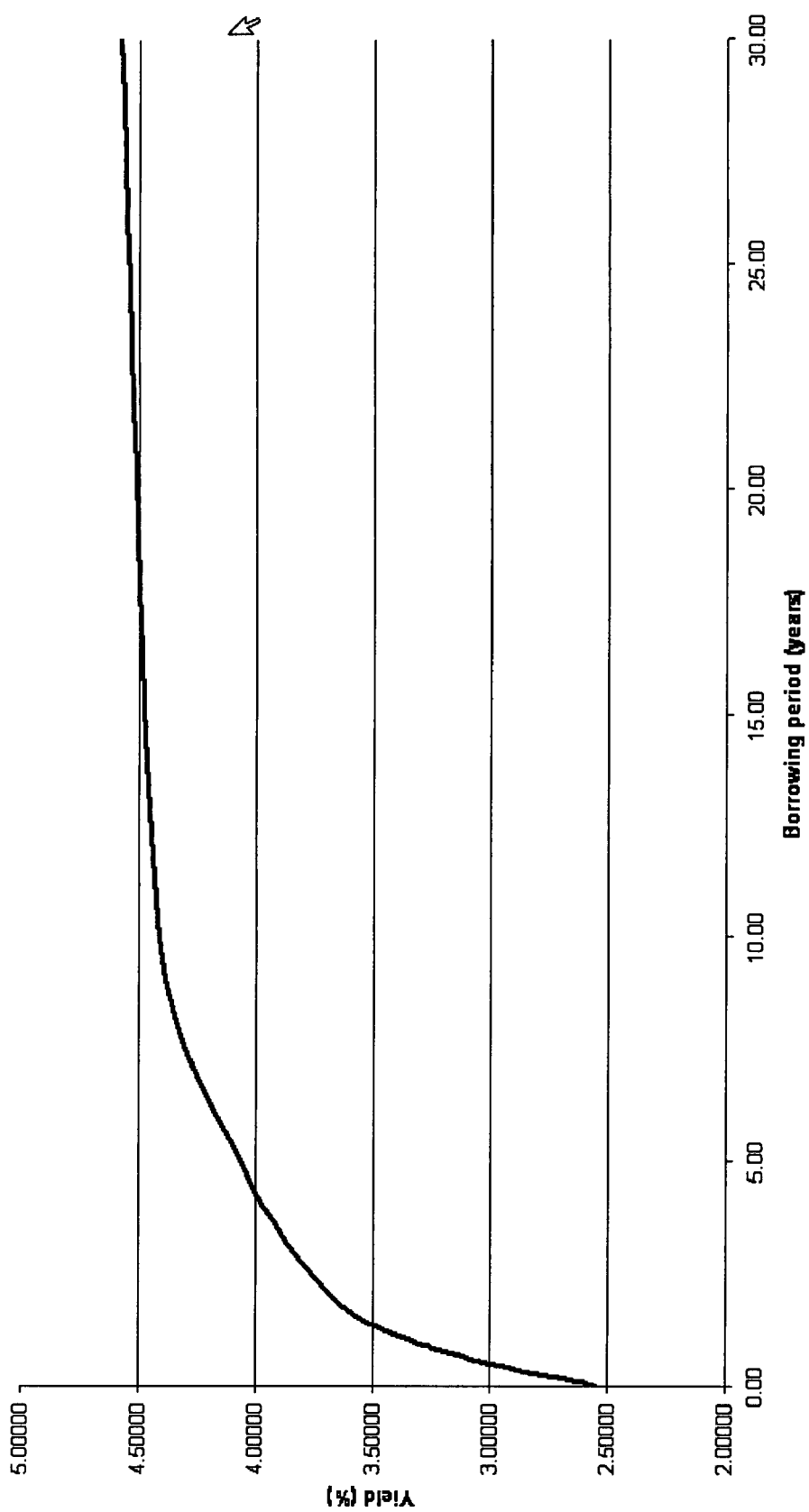
FIG. 1 is a graph showing an example of a bond yield curve.
Figure 2:
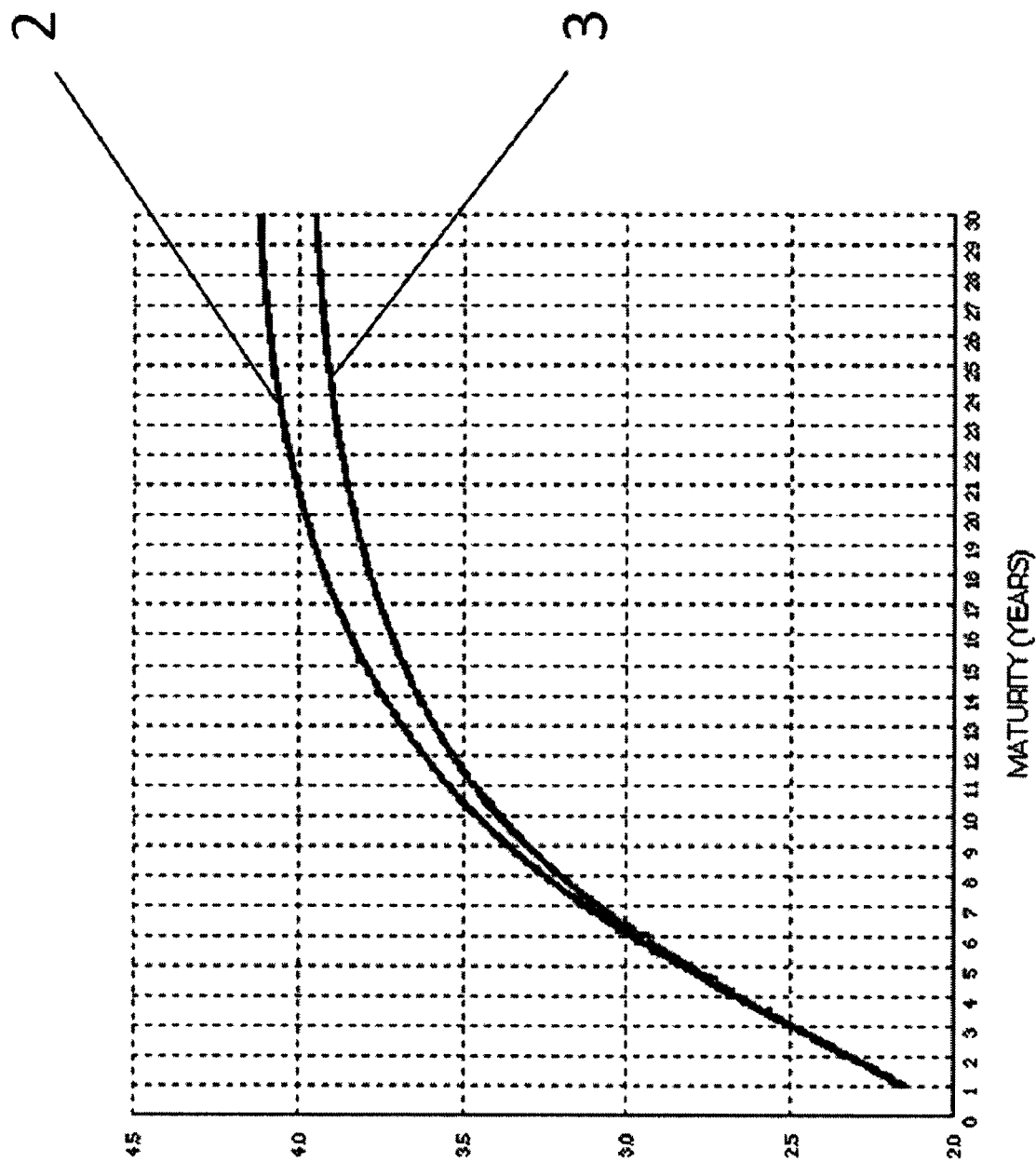
FIG. 2 is a graph showing examples of a zero coupon bond curve and a par yield curve.
Figure 3:
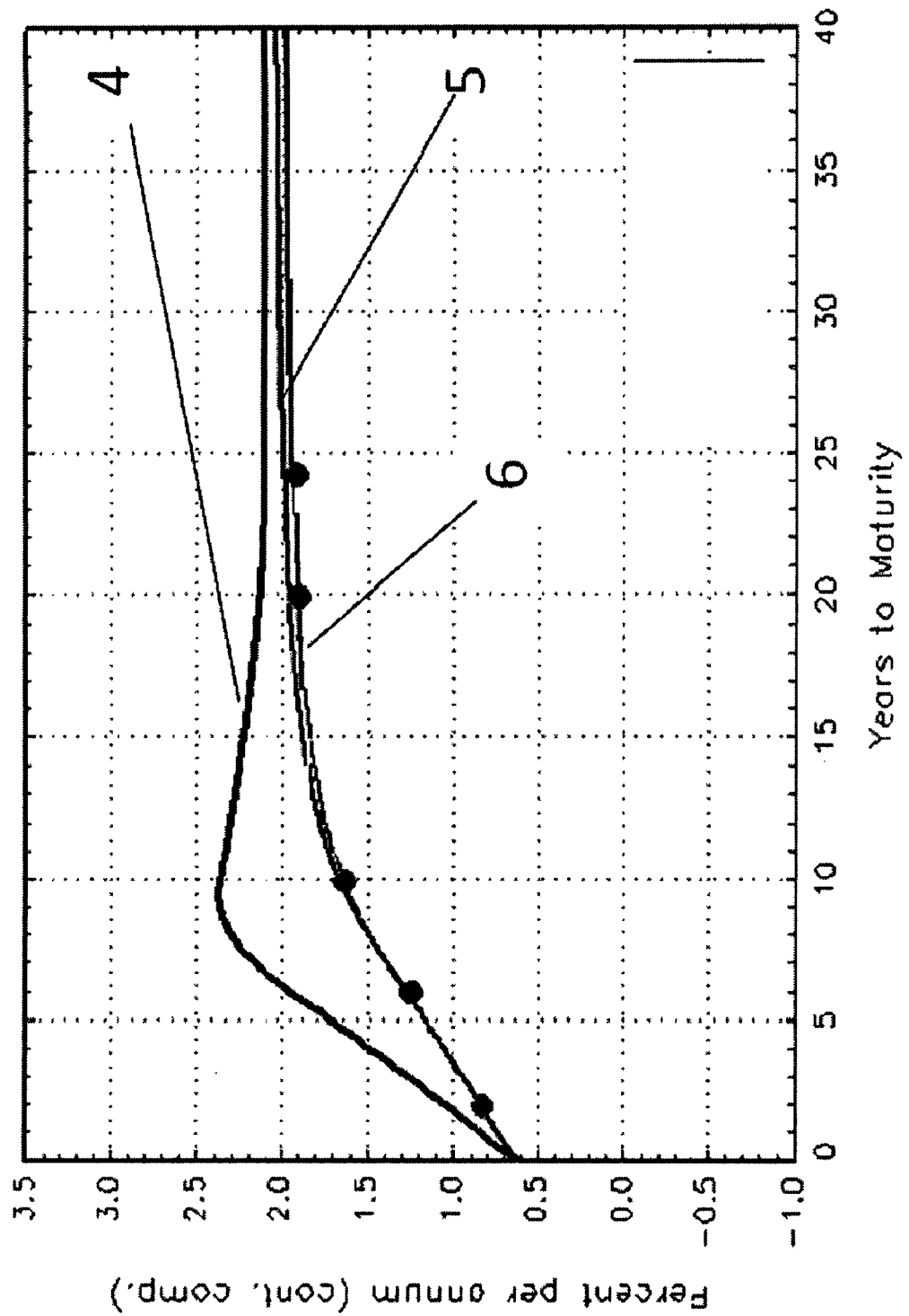
FIG. 3 is a graph showing examples of a forward curve, a zero coupon yield curve and a par bond yield curve.

Indices are described herein to accurately reflect IRS of varying duration. Investors wishing to protect themselves from adverse movements in an interest rate curve, i.e. by way of the yield curve steepening or flattening, may buy or sell based on the appropriate index. What is bought or sold is, at its most basic, an agreement where the variable term to the agreement is the index. The greater the change in the value of the index from the time the agreement begins, the more the agreement is worth to one of the two parties to the agreement. The difference in the underlying index from inception of the agreement to the termination of the agreement is multiplied by some value set at the beginning of the agreement to determine how much one party to the agreement owes the other party to the agreement, i.e. a notional amount. Just like an IRS, this agreement is a derivative. That is, the agreement is a financial instrument that has its value derived from an underlying asset. As in any derivative, market participants enter into an agreement to exchange money, assets or some other value at some future date based on the underlying asset. In this case, the underlying assets are synthetic interest rate swaps that are calculated to accurately reflect or track an actual IRS of agreed to parameters.

The index products described herein are for the periods that are currently quoted over the on-the-run US treasuries which are 2 year, 3 year, 5 year treasuries, the 10 year note and the 30 year bond. These are quoted as semi bond points and as spread to treasury 2×3, 2×5, 2×10, 2×30, 3×5, 3×10, 3×30, 5×10, 5×30, 10×30. Also to be included are butterfly trades which involve buying or selling the wings and selling or buying the body. These include 2×3×5, 2×5×10, 2×10×30, 3×5×10, 3×10×30 and 5×10×30.

It is also believed that new market participants will be attracted to curve trading as credit issues and back office restrictions bar them from trading at present.

IRS spreads are set each day for option settlement. It would be already accepted duration weighting standards which would apply and be reset at the end of each calendar month.

A preferred embodiment of the present invention is derivative financial instrument comprising a nominal amount; a financial instrument value directly proportional to the nominal amount and directly proportional to a numerical index. The numerical index is proportional to an interest rate swap value determined from an interest rate swap. A first side of the interest rate swap has a first set of parameters for calculating a first set of payments; and a second side of the interest rate swap has a second set of parameters for calculating a second set of payments. The second set of parameters includes a variable parameter not contained in the first set of parameters. The value of the interest rate swap is the value of the first set of payments less the value of the second set of payments. In a preferred embodiment of the invention, the variable parameter is a variable rate of interest. In another preferred embodiment of the invention, the first set of parameters includes an interest rate having a fixed rate over a term of the interest rate swap; and the second set of parameters includes an interest rate having a variable rate of interest over the term of the interest rate swap. In a further preferred embodiment of the invention, the interest rate swap is a synthetic transaction. In a further preferred embodiment of the invention, the financial instrument is easily purchased and sold on an essentially transparent market. In a further preferred embodiment of the invention, a single counterparty exists to all purchases and sales of the derivative financial instrument. In a further preferred embodiment of the invention, the derivative financial instrument is either a bought financial instrument or a sold financial instrument and further wherein the financial instrument value for a bought financial instrument increases proportionally to the value of the interest rate swap and the financial instrument value for a sold financial instrument decreases proportionally to the value of the interest rate swap. In a further preferred embodiment of the invention, the interest rate swap is for a number of years, the number of years being one of the first set of parameters and the second set of parameters. In a further preferred embodiment of the invention, the variable parameter is a yield curve from a debt obligation having a term equal to the number of years of the interest rate swap. In a further preferred embodiment of the invention, the first set of payments are discounted by a zero coupon bond yield curve. In a further preferred embodiment of the invention, the value of the variable parameter is determined from publicly available information not under the control of the buyer or seller of the financial instrument. In a further preferred embodiment of the invention, the value of the variable parameter changes constantly during at least a portion of a business day and the numerical index is calculated in real-time along with the variable parameter change. In a further preferred embodiment of the invention, the interest rate swap is for a set number of years, and further wherein: neither the first set of parameters or the second set of parameters includes shortening of the term defined by the set number of years as a parameter in calculating the first set of payments or the second set of payments. All of the preferred embodiments for the derivative financial instrument involving a first swap are applicable for the derivative financial instrument comprising a first swap and a second swap.

A preferred embodiment of the present invention is derivative financial instrument comprising a nominal amount; a financial instrument value directly proportional to the nominal amount and directly proportional to a numerical index. The numerical index is proportional to an interest rate swap value determined from an interest rate swap. A first side of the interest rate swap has a first set of parameters for calculating a first set of payments; and a second side of the interest rate swap has a second set of parameters for calculating a second set of payments. The second set of parameters includes a variable parameter not contained in the first set of parameters. The value of the interest rate swap is the value of the first set of payments less the value of the second set of payments. In a preferred embodiment of the invention, the variable parameter is a variable rate of interest. In another preferred embodiment of the invention, the first set of parameters includes an interest rate having a fixed rate over a term of the interest rate swap; and the second set of parameters includes an interest rate having a variable rate of interest over the term of the interest rate swap. In a further preferred embodiment of the invention, the interest rate swap is a synthetic transaction. In a further preferred embodiment of the invention, the financial instrument is easily purchased and sold on an essentially transparent market. In a further preferred embodiment of the invention, a single counterparty exists to all purchases and sales of the derivative financial instrument. In a further preferred embodiment of the invention, the derivative financial instrument is either a bought financial instrument or a sold financial instrument and further wherein the financial instrument value for a bought financial instrument increases proportionally to the value of the interest rate swap and the financial instrument value for a sold financial instrument decreases proportionally to the value of the interest rate swap. In a further preferred embodiment of the invention, the interest rate swap is for a number of years, the number of years being one of the first set of parameters and the second set of parameters. In a further preferred embodiment of the invention, the variable parameter is a yield curve from a debt obligation having a term equal to the number of years of the interest rate swap. In a further preferred embodiment of the invention, the first set of payments are discounted by a zero coupon bond yield curve. In a further preferred embodiment of the invention, the value of the variable parameter is determined from publicly available information not under the control of the buyer or seller of the financial instrument. In a further preferred embodiment of the invention, the value of the variable parameter changes constantly during at least a portion of a business day and the numerical index is calculated in real-time along with the variable parameter change. In a further preferred embodiment of the invention, the interest rate swap is for a set number of years, and further wherein: neither the first set of parameters or the second set of parameters includes shortening of the term defined by the set number of years as a parameter in calculating the first set of payments or the second set of payments.

Another preferred embodiment of the present invention has a first and second interest rate swap used for determining a spread interest rate swap value which, in turn, is used for determining a spread IRS index. The first interest rate swap is essentially unchanged. A first side of the second interest rate swap has a third set of parameters for calculating a third set of payments and a second side of the second interest rate swap has a fourth set of parameters for calculating a fourth set of payments, the fourth set of parameters including a second variable parameter not contained in the third set of parameters. The spread interest rate swap value is the value of the first set of payments less the value of the second set of payments plus the value of the fourth set of payments less the value of the third set of payments. All of the preferred embodiments for the derivative financial instrument involving a first swap are applicable for the derivative financial instrument comprising a first swap and a second swap.

Another preferred embodiment of the present invention has a first, second and third interest rate swap used for determining a butterfly interest rate swap value which, in turn, is used for determining a butterfly IRS index. The first and second interest rate swap are essentially unchanged. A first side of the third interest rate swap has a fifth set of parameters for calculating a fifth set of payments and a second side of the third interest rate swap has a sixth set of parameters for calculating a sixth set of payments, the sixth set of parameters including a third variable parameter not contained in the fifth set of parameters. The butterfly interest rate swap value is the value of the first set of payments less the value of the second set of payments plus the value of the fourth set of payments less the value of the third set of payments plus the value of the fifth set of payments less the value of the sixth set of payments.

Another preferred embodiment of the present invention is a derivative financial instrument comprising a value determined from a nominal amount and an index; the index calculated from an underlying interest rate swap which is synthetically sold and immediately rebought at a predetermined frequency.

DETAILED DESCRIPTION OF THE INVENTION

A market index keyed to the IRS market described above provides enormous benefits to current IRS market participants as well as new IRS market participants. The index would not usually involve any underlying "notional amounts" for the loans. Rather, the basic value of the index to the purchaser or seller of a financial instrument based on the index would be valued completely by the amount of money invested. Some examples contained herein use United States Dollars ("USD") and fixed income products most familiar to investors and investment services professionals operating in the United States. Other possible indices encompassed by the herein described invention should in no way be assumed to be limited to United States dollars or the exemplary fixed income products presented. In fact, these indices are applicable to any market, currency, mixed currencies and analogous fixed income products wherein the tools, e.g. yield and zero coupon curves, herein described are either available or translatable.

A market has developed, as traders wish to capture the difference in yield between two medium term IRS periods, known as an over the counter medium term IRS forward spread semi-bond market. The following indices seek to provide a market to satisfy this demand, giving the investor the ability to achieve full replication of one or more IRSs, whilst lowering transaction costs, offering completeness, investability, accurate data, complete data and clear published open rules. These goals, besides being desirable in their own right, will result in high liquidity of the financial instruments sold and traded in light of these indices.

Setting up IRS indices, i.e. fixing of proper index calculation rules, is the first step in starting and maintaining, in good and reliable manner, a market for products valued by said index, i.e. derivative products. The indices include three types of indices to start and to maintain afterwards: 1. Indices for IRS Trades: For every government security lifetime from 2 to 30 (full) years=29 Indices. Index reflects cost to buy the trade, i.e. to enter a swap as fixed-rate receiver and floating-rate payer, but it is also possible to sell the index and thus enter the trade as the floating-rate receiver. 2. Indices for IRS Spread Trades: For two different security lifetimes. Purchasing such an index results in effectively buying the longer maturity security and selling the short maturity security. Selling such an index results in effectively selling the long maturity and buying the short maturity. All possible combinations of benchmark government security lifetimes (2, 3, 5, 10, 30)=10 indices: 2×3, 2×5, 2×10, 2×30, 3×5, 3×10, 3×30, 5×10, 5×30 and 10×30. 3. Indices for IRS Butterfly Trades: For certain combinations of three benchmark government security lifetimes buy the body (middle maturity) and sell the wings (shorter and longer maturities). Selling the index results in selling the body and buying the wings. The most prevalent butterfly trades=6 indices: 2×3×5, 2×5×10, 2×10×30, 3×5× 10, 3×10×30, 5×10×30; though any other combinations are possible. The indices of all three groups together are 29+10+ 6=45 indices.

The purpose of each index is to reflect the movements in the IRS market by entering synthetic IRS, IRS spread and IRS butterfly trades on the origin day. The "origin day" is the starting date of a given index. The value of an index is computed on an ongoing real-time basis for all of the synthetic positions entered. This computation incorporates every change of every parameter upon which the synthetic IRS is based, e.g. on every day which is a business day either in NY or in London or both, in real-time.

Some aspects on the main structure of the USD IRS market: The USD IRS market is defined in relation to the standard on-the-run US Treasury bonds. These benchmark bonds have lifetimes of (at issue) 2, 3, 5, 10 and 30 years. IRS rates are defined for the benchmark lifetimes of 2, 3, 5, 10 and 30 years: 1. Take the mid yield of the given on-the-run US Treasury bonds; 2. Add a spread in basis points, one spread for bid level and one spread for offer level, to that mid yield; and 3. Result is the IRS rate, one rate for bid level and one rate for offer level.

When considering the swap lifetime, the quotes for the swaps always are for full years, traded spot (today+2 trade days), regardless of the daily shortening of lifetime of the US Treasury bonds to which the spreads refer to. This leads to the situation that, when a new US Treasury bond is issued, which from then on is the new on-the-run treasury bond of the respective benchmark lifetime 2, 3, 5, 10 or 30, the spreads have to be adjusted by IRS traders (sources for the rates), to the effect that the resulting IRS rates remain the same as (immediately) before the new issue was out.

The spreads, and thus the resulting IRS rates, for the lifetimes of 11 and 12 years, are taken directly from the 10 year Treasury bond. The spreads, and thus the resulting IRS rates, for all other lifetimes (4, 6, 7, 8, 9, 13 . . . 29) are generated on base of an interpolation between the lifetimes of the nearest two benchmark treasury bonds, e.g. the spread for 4 years is quoted using the mid yield of the 3 year Treasury and the mid yield of the 5 year Treasury, divided by 2. Numerous sources of IRS rates, e.g. banks, are available for setting a benchmark. Deviations between different providers usually are small and numerous providers can be averaged.

There are two types of IRS day count conventions: a) "Semi Bond": fixed rate paid 30/360 semi-annually modified following (UK business days) and floating rate 3-month LIBOR actual/360 quarterly modified following (UK business days); and b) "Annual Money": fixed rate paid actual/ 360 annually modified following (UK business days) and floating rate 3-month LIBOR actual/360 quarterly modified following (UK business days). The standard IRS type is Semi Bond (above a).

Dates and Times: All indices shall base on swaps that follow the Semi Bond rule. All indices shall be calculated using mid swap rates, the offer and bid differences shall not be taken into account. Start of the daily valuations shall be 09:00 CET=08:00 UK. There shall be a daily fixing of the index values for index history building purposes, at 10:00 NY=16: 00 CET=15:00 UK. The end of the daily valuations shall be 17:00 NY=23:00 CET=22:00 UK.

Regarding notional amounts, all indices shall start with a particular index value of, e.g., 100.00. Thus, there is no need to use a notional amount. Every index value can be converted into a USD nominal amount by multiplication. For the calculation of the indices reflecting Spread Trades and Butterfly Trades however, there need to be done certain notional amount adjustments. For spread trades, the notional amount of the long leg (which is bought into the index) can be set to $25 million and the notional amount of the short leg (which is sold into the index) shall be adjusted so that the modified duration of the short leg, at the start of the index, or at rebalancing time respectively, shall be the same as the modified duration of the long leg. For butterfly trades, the notional amount of the body (which is bought into the index) may be set to $25 million. The body may then be considered as divided into two parts of $12.5 million each. The notional amounts of each of the wings (which are sold into the index) shall be adjusted so that its modified duration, at the start of the index, or at rebalancing time respectively, shall be the same as the modified duration of the half body.

Index data to publish regarding the 45 indices (29+10+6=45) can be created and tracked for IRS trades, IRS spread trades and IRS butterfly trades. Each of these indices stands alone and has no affect on the other indices; all indices are handled separately based on external, publicly available information. The index values will reflect the value of the IRS, IRS spread and IRS butterfly trades. On the initial day, their value is assigned an index value of 100.00. The index figures can be considered synthetic.

As long as index values, daily change values and interpolated swap rates for non-benchmark year's lifetime would be sufficient as output values, US Treasury bond data or issuance is not needed. Should however spread to treasuries values be desired as part of the indices service, it could be used. The index would need to hold and maintain data regarding the on-the-run benchmark US Treasury bonds, including the processes of roll from old to new on-the-run benchmark Treasuries, which involves monitoring Treasury issuance very closely, and acting on changes in a narrow timeframe on every Treasury issue day. One would need to take care of the Treasury's prices and yields, and reverse engineer the spread to Treasuries from the swap rates used for index calculations, and the yields of the respective Treasury benchmark bonds. The only excess value would be the calculation of spread to Treasury Mid values, where obviously spread to Treasury offer and bid values are already there.

To avoid synthetic cash flow paid out from the synthetic swap positions, all IRS trades may be sold and newly bought synthetically. This rebalancing should occur as frequently as necessary to increase the accuracy of the index. Frequencies of annually, semi-annually, quarterly, monthly, daily, every trading day and numerous times per day are all possible. Monthly rebalancing, used in the example herein, is utilized in a preferred embodiment of the present invention. Presuming appropriate automation is present, daily rebalancing is a most preferred embodiment of the present invention. Rebalancing also avoids the shortening of lifetimes of all positions which at beginning are full years, so that no position lifetime can be less than the respective number of years less the rebalancing frequency. The effect of increased rebalancing frequency is a reduction of the effect of shortening of lifetimes of the synthetic positions. It is expected that for rebalancing frequency of one day or greater, i.e. hourly or every second, the effect of shortening lifetimes may be negligible.

To avoid deferrals resulting from holidays or weekends, monthly rebalancing shall always be done on the same day every month, e.g., the second Wednesday of every month. The rebalancing procedures, which include the recalculation of notional amounts for spread and butterfly trades indices, shall take place on this day at a specified and consistent time. For example, 10:00 NY=16:00 CET (Central European Time) =15:00 UK. If the rebalancing frequency is daily, a most preferred embodiment would rebalance at a time when all information is available and not changing, e.g. after-hours for all relevant markets.

In order to calculate a particular IRS index, all of the synthetic IRS positions which have been reset at the last rebalancing event (e.g., the $2^{nd}$ Wednesday of every month or daily) have to be valuated. The rebalancing event results in the rates and maturities of the synthetic IRS matching the values of the current (e.g., $2^{nd}$ Wednesday 15:00 UK or daily) curves, as opposed to the curves underlying the synthetic IRS from the previous rebalancing date. This rebalancing is exactly the same as the process of valuing the swap at inception; all of the same data sources are used for an IRS set to begin that day. Thus, whether at rebalance or inception, the index is reset such that the value of the swap to either side is zero. Rebalancing, because it is a synthetic process, is accomplished such that it has no effect on the index. After rebalancing, as the underlying rates which determine swap rates change according to the market movements, and the remaining lifetimes of the IRS positions decrease day by day during the month (e.g., from second Wednesday to second Wednesday); the IRS positions, and thus the index, change in value. In the event that rebalancing is done daily or every business day, the effect of lifetime of the IRS position should be minimal.

For the valuation of IRS positions, a zero interest rate curve is created from the current LIBOR rates and the current swap rates, taking into account the day count conventions of the market, e.g., actual/360 quarterly for the LIBOR variable leg and 30/360 semi-annually for the fixed/swap leg, both modified following. The discount factors from this curve are multiplied by the cash flows of the synthetic IRS positions to valuate, and the results are added up to result in the values of the synthetic IRS positions.

The value of any of the 2 to 30 years synthetic IRS positions is reflected in the change to the respective 2-30 years IRS index, compared to the respective 2 to 30 years IRS index value reached at the last rebalancing time. For any of the 2 to 30 years IRS positions, the respective change amount is added to the index value of the last rebalancing time. The result is the current index value. Thus, the current index value may be calculated by determining the change in value since the last rebalance and adding this change to the index determined at the last rebalance. Alternatively, presuming the accuracy of the real-time data that has caused the index in question to change with each change in the underlying curves that determine the value of the synthetic IRS, the index may also be calculated "tick-by-tick" of changes in the underlying curves. Calculated from rebalance to rebalance or "tick-by-tick", the index value should be identical under either process.

For spread and butterfly interest rate positions, there is not only one swap to valuate, but a portfolio of two (in case of spread positions) or three (butterfly positions) IRS valuations to determine in rebalancing. For any of the spread and butterfly IRS positions, the value of its respective portfolio expresses the change to the respective index, compared to the index value reached at the last rebalancing time. For any of the spread and butterfly IRS positions, the respective change amount is added to the index value of the last rebalancing time. The result is the current index value. In the same manner as described above, the index may be calculated in real-time, "tick-by-tick", to arrive at the same index value as calculated at rebalance.

For swaps paying semi-annually on the fixed leg and quarterly on the floating leg (as in the USD market) at a horizon of 30 years, for each time the index is calculated there are 60 payment dates starting from settlement. These payment dates are designated $t_i$, starting from $t_0$ (settlement) and running up to $t_{60}$ (which occurs 30 years from $t_0$). For each $t_i$ we have a current swap rate $s_i$. For valuation we need to calculate the present value, $d_i$, factor for each $t_i$. Let $c_{ij}$ be the amount due under a swap running i periods at date $t_j$. Normally this is $s_i/2$, but may differ slightly because of the modified following usance. Example: Let's have settlement ($t_0$) be 8 Aug. 2007, and let's assume the 4 year swap rate is 5%. The coupon payment days ($t_1$; $t_2$; $t_3$; $t_4$; $t_5$; $t_6$; $t_7$; $t_8$) for this swap are (Aug. 10, 2007; Feb. 11, 2008; Aug. 11, 2008; Feb. 10, 2009; Aug. 10, 2009; Feb. 10, 2010; Aug. 10, 2010; Feb. 10, 2011; Aug. 10, 2011) (adjusted for weekends) and the swap fix payments ($c_{81}$; $c_{82}$; $c_{83}$; $c_{84}$; $c_{85}$; $c_{86}$; $c_{87}$; $c_{88}$) are (2.513888889; 2.5; 2.486111111; 2.5; 2.5; 2.5; 2.5; 2.5), according to the modified following usance. As a swap paying the current swap rate has zero value, we have:

$$\sum_{j=1}^{i} d_j c_{ij} + 100 d_i = 100$$

Rearranged this gives:

$$\sum_{j=1}^{i} d_j c_{ij} + 100 d_i = \sum_{j=1}^{i-1} d_j c_{ij} + d_i c_{ii} + 100 d_i$$

$$= \sum_{j=1}^{i-1} d_j c_{ij} + d_i (c_{ii} + 100)$$

$$= 100$$

$$d_i = \left(100 - \sum_{j=1}^{i-1} d_j c_{ij}\right) / (100 + c_{ii})$$

This is used to calculate the $d_i$ iteratively.

If swap rates are not quoted semi-annually, missing rates are interpolated linearly from the quoted rates. Further, there are no swap rates for 1 year and 6 months. Therefore the LIBOR rates for 6 and 12 months are used for the calculation of the present value factors for these payments.

To calculate the index, the swaps set at the latest rebalancing are used. These are the swaps we have to valuate to calculate the index. The same notation as above is used, but with upper case letters. If the latest rebalancing has been done on the recent $2^{nd}$ Wednesday of the month, to calculate the index for the Friday following this day (provided there are no holidays between) use: $T_i$=the settlement date i periods from that Friday; $S_i$=the swap rate fixed at the latest rebalancing for the swap running i periods; $C_{ij}$=the amount payed by the swap running i periods at date $T_j$; and $D_i$=The present value factor for a specific settlement date $T_i$. Also needed: L=The next payment on the floating leg (calculated from the 3 month LIBOR rate fixed for the floating leg); $T_L$=the date of the next floating leg payment date; and $D_L$=The present value factor for $T_L$. $T_i$, $S_i$, $C_{ij}$ and L are known from the fixing. $D_i$ is needed for the valuation. If it is not the rebalancing day, the $t_i$ differ from the $T_i$ and the $D_i$ have to be interpolated from the $d_i$. This is done using exponential interpolation (i.e., linear interpolation on the logarithms of the $d_i$). (Example: Assume that settlement is 10 Aug. 2007 and we've calculated $d_6$ (10 Aug. 2010) and $d_7$ (10 Feb. 2011) as 0.8638 and 0.8430. We need to interpolate $D_7$ for 6 Jan. 2011. Calculate: Time to 10 Aug. 2010 is 3 years, time to 10 Feb. 2011 is 3+184/365 years=3.5041 years, time to 6 Jan. 2011 is 3+149/365 years=3.4082 years. Therefore, $D_7$=exp(ln(0.8638)+(ln(0.8638)−ln(0.8430))/(3.5041−3)*(3.4082−3)))=0.8469.) For $D_L$ (nearly 3), $D_0$ (nearly 6) and $D_1$ (nearly 12 months) the LIBOR rates are taken into account for interpolation. (e.g. $D_L$: discount factors for two and three months are calculated directly from the two and three month LIBOR rate, then interpolation is performed as described above).

Having the $D_i$ calculated, the swaps may be valued. Let $P_i$ denote the current present value of the swap running i periods at the latest rebalancing. Thus:

$$P_i = \sum_{j=1}^{i} D_i C_{ij} + 100 D_i - 100 - (D_L L - 100(1 - D_L))$$

Note that at the rebalancing, where $T_i = t_i$, $S_i = s_i$ and $D_i = d_i$, all $P_i$ are 0. Let the current Swap Index value (for i periods) be noted by $x_i$, and the Swap Index value at the latest rebalancing by $X_i$. Then:

$$x_i = X_i + P_i$$

This gives the current value of the index.

Detailed Example

This example shows the calculation of the index. A 3 year index and its movement from 11th to 12th of July 2007 is shown. July 11th is a 2nd Wednesday in a month where the index is rebalanced. Tables 1 and 2 show the LIBOR and swap rates fixed on that day and shows the calculation of the factors used to value a swap, designated $P_V$. The swap rates are used as the coupons for the next months.

TABLE 1

| Trade: | Jul. 11, 2007 |
| Settlement: | Jul. 13, 2007 |

| LIBOR | |
| --- | --- |
| Months | Rate (act/360) |
| 2 | 5.34% |
| 3 | 5.36% |
| 6 | 5.38% |
| 12 | 5.39563% |

| Swap | |
| --- | --- |
| Years | Rate (30/360 semiannually) |
| 2 | 5.35% |
| 3 | 5.393% |

TABLE 2

| Time 30/360 | | | | |
| --- | --- | --- | --- | --- |
| Time | Day | mod. follow. | Coupon | $P_V$ factor |
| 3 mos | Oct. 15, 2007 | | | |
| 0.5 | Jan. 14, 2008 | 0.502777778 | | 0.973096583 |
| 1 | Jul. 14, 2008 | 0.5 | 5.413055% | 0.947862402 |
| 1.5 | Jan. 13, 2009 | 0.497222222 | 5.381527% | 0.923456091 |
| 2 | Jul. 13, 2009 | 0.5 | 5.350000% | 0.899833961 |
| 2.5 | Jan. 13, 2010 | 0.5 | 5.371500% | 0.875906759 |
| 3 | Jul. 13, 2010 | 0.5 | 5.393000% | 0.852424438 |

Table 1 shows the LIBOR and swap rates fixed on 11th July (for settlement on July 13th). Table 2 shows the calculations. The second column of Table 2 shows the payment dates (dd/mm/yy) of the swap starting at July 11th with settlement July 13th. Note that, due to weekends, they are not always on the 13th. The third column of Table 2 shows the times to be used as the length of the coupon period ending at that day (calculated 30/360 modified following as the fixed leg on the swap pays). This means that the payment of the swap's fixed leg on a day in the second column is its swap rate multiplied by the corresponding number in the third column. Calculating for the $P_V$ factors, the values for 0.5 and 1 year can be calculated from the LIBOR rates. For the others, the swap rates for 1.5, 2, 2.5 and 3 years are needed to use the usual bootstrap algorithm (with a semiannually grid). The rates for 2 and 3 years are quoted and shown under COUPON. For 2.5 years interpolation from the quoted 2 and 3 years is used. Similarly, 1.5 years is interpolated from the quoted 1 and 2 years. Here, at first glance, seems to be a problem as there is no swap rate for a 1 year swap. However, the correct rate for a hypothetical 1 year swap can be easily calculated from the $P_V$ factor for 0.5 and 1 year. This is used for interpolation for 1.5 years. Having set up the rates in COUPON column, the $P_V$ factors can be easily calculated.

Applying these $P_V$ factors calculated from the swap rates at fixing on the swaps set up here at rebalancing (e.g. the 3 year swap paying 5.393% fix and 5.36% floating), we would get a zero value. However, as the swap rates will change after fixing on the same day, the $P_V$ factors will change, giving the swap a non-zero value and thus driving the index on a real time basis.

Things get more complicated on the next day where the maturity of the swap set up at rebalancing (which represents the index) has shortened. Tables 3, 4 and 5 show the LIBOR and swap rates fixed on that day. Again, the tables shows the calculation of the $P_V$ factors for a swap starting on that day. This time, however, the $P_V$ factors are needed for payment dates of the swap set up on the previous day (the rebalancing day) too. Tables 3, 4 and 5 shows how these are interpolated.

TABLE 3

| Trade: | Jul. 12, 2007 |
| Settlement: | Jul. 16, 2007 |

LIBOR

| Months | Rate (act/360) |
| --- | --- |
| 2 | 5.34% |
| 3 | 5.36% |
| 6 | 5.386% |
| 12 | 5.41625% |

Swap

| Years | Rate (30/360 semiannually) |
| --- | --- |
| 2 | 5.398% |
| 3 | 5.445% |

TABLE 4

| Time | Day | Time 30/360 mod. follow. | Coupon | PV factor | Time (actual) |
| --- | --- | --- | --- | --- | --- |
| 2 months | Sep. 17, 2007 | | | 0.99074152 | 0.172131 |
| 3 months | Oct. 16, 2007 | | | 0.98648732 | 0.251366 |
| 0.5 | Jan. 16, 2008 | 0.5 | | 0.97320907 | 0.502732 |
| 1 | Jul. 16, 2008 | 0.5 | 5.433712% | 0.94780872 | 1.000000 |
| 1.5 | Jan. 16, 2009 | 0.5 | 5.415856% | 0.92298642 | 1.502732 |
| 2 | Jul. 16, 2009 | 0.5 | 5.398000% | 0.89897694 | 2.000000 |
| 2.5 | Jan. 19, 2010 | 0.50833333 | 5.421500% | 0.87443824 | 2.510929 |
| 3 | Jul. 16, 2010 | 0.49166667 | 5.445000% | 0.85110874 | 3.000000 |

TABLE 5

| Day | Time (actual) | PV factor | | |
| --- | --- | --- | --- | --- |
| | | | −0.00930161 | |
| Oct. 15, 2007 | 0.24863388 | 0.98663371 | −0.01360481 | −0.01345642 |
| Jan. 14, 2008 | 0.49726776 | 0.97349582 | −0.02715635 | −0.02686175 |
| Jul. 14, 2008 | 0.99453552 | 0.94808421 | −0.05360257 | −0.05331196 |
| Jan. 13, 2009 | 1.49453552 | 0.92338587 | −0.08014076 | −0.07970807 |
| Jul. 13, 2009 | 1.99180328 | 0.89936759 | −0.1064979 | −0.10606344 |
| Jan. 13, 2010 | 2.49453552 | 0.87521508 | −0.13417361 | −0.13328562 |
| Jul. 13, 2010 | 2.99180328 | 0.85149456 | −0.16121538 | −0.16076217 |

Table 3 shows the LIBOR and swap rates fixed on 12th July (for settlement on July 16th). The algorithm used regarding Tables 1 and 2 is used to get the $P_V$ factors for the payment dates of a swap starting on (settlement) July 16th. This is shown in Table 4.

However, to get the value of the swap set up the day before, we need $P_V$ factors for the payment dates of a swap starting on July 13$^{th}$, i.e. settlement. These are interpolated in Table 5. The method used is exponential interpolation, which means a linear interpolation on the logarithms of the $P_V$ factors. That is, take the logarithms of the $P_V$ factors, interpolate linearly on them, then take the exponential of the interpolated value to get the desired $P_V$ factor. This method is also known as the method of constant forward rates. Therefore, for both day columns of Table 4 and Table 5, the time in years from settlement (16 Jul. 2007) is calculated. Note that (as opposed to the payment calculation under the TIME 30/360 Column, where 30/360 calculation is used) we count the actual days here to get a smooth discount function. The actual interpolation values are given in the last three columns of Table 5.

The valuation of the swap using the discount factors calculated in the $P_V$ factor Column of Table 5 can be found in Table 6, which shows the valuation of the swap on that day, using the $P_V$ factors from Tables 3-5.

TABLE 6

| Day | Payment | $P_V$ factor | |
| --- | --- | --- | --- |
| | | Fixed Leg | |
| Jan. 14, 2008 | 2.711481% | 0.973495817 | |
| Jul. 14, 2008 | 2.696500% | 0.948084206 | |
| Jan. 13, 2009 | 2.681519% | 0.923385867 | |
| Jul. 13, 2009 | 2.696500% | 0.899367592 | |
| Jan. 13, 2010 | 2.696500% | 0.875215078 | |
| Jul. 13, 2010 | 2.696500% | 0.851494558 | |
| | | 99.902874% | Value of Fixed Leg |

TABLE 6-continued

| Day | Payment | $P_V$ factor | |
|---|---|---|---|
| Floating Leg | | | |
| Oct. 15, 2007 | 1.399556% | 0.986633708 | |
| | 1.354737% | | |
| | | 100.044220% | Value of Floating Leg |
| Swap Value | | −0.141345% | Value of Receiver Swap |
| Index Value at 11 Jul. 2007: | | 98.785758% | |
| Index Value at 12 Jul. 2007: | | 98.644413% | |

Table 6 is the valuation of the 3 year swap set up at July 11th (settlement July 13th) on the next day (July 12th, settlement July 16th). For ease of calculation, the principal at each leg of the swap is included. So we regard the fixed leg as a bond, the floating leg as a floater. The Value of the Fixed Leg is straightforward. For the floating leg: A floater set up on July 16$^{th}$ (settlement) but paying on 13th (i.e. a floater with a short first coupon) would have par value when paying the 'correct' first coupon (i.e. the coupon interpolated from the LIBOR rates). So we can measure the difference from par by measuring the (present value of) the difference between the 'correct' first coupon to the current first coupon fixed on the previous day. The correct first coupon can be calculated from the interpolated $P_V$ factor and is 1.354737%. The current coupon is 1.399556%. The value of the floater in this example is thus 100.044220%. So the swap's value to the receiver is fixed leg-floating leg, which gives −0.1413. This means that the index for 3 years has gone down by this amount on July 12th compared to July 11th. Adding this to the value of July 11th (which is known by this time as 98.785758) gives the index value for July 12$^{th}$, i.e. and 98.644413.

The values of both legs are calculated and combined and give the change of the present value of the swap compared to 11.07.07. This change is added to the index value of 11.07.07 to give the index value for 12.07.07. Although the example uses a short maturity swap of 3 years, the calculation method is the same for longer maturities.

When the index is rebalanced once a month on the second Wednesday it means that for succeeding days (July 13th, July 16th etc.) the swap started on July 11th is valued, so we get its change compared to July 11th (where its value was zero) and add it to the index value on July 11th to get the index value of the day. This continues until the index is rebalanced next time (on August 8th).

If the rebalancing is done daily instead of once a month, in accordance with a preferred embodiment of this invention, this would not change the basic methodology, the difference would just be to value a swap set up the previous day and add this to previous day's index value. This, as opposed to valuing a swap set up on the last second Wednesday and add this to the last second Wednesday's index value.

Real Time Market Data and Swap Parameters

Real-time market data providing environments would be the most appropriate input data sources in handling the IRS indices contemplated herein. Assuming that spread to Treasury values can be omitted as project output values (see above), all calculations can be performed using: Quoted IRS Semi Bond Swap rates; and standard USD LIBOR rates which are necessary as sources for interpolations (LIBOR for 1, 2, 3, 6 months and 1 year).

The source for IRS Semi Bond Swap rates should be fixed. Again, many sources for IRS Semi Bond Swap rates exist. The standardization and possible averaging from multiple sources would need to be built in and disclosed as part of the index. Transparency and resultant liquidity are key to the indices. There are quotes available for both offer and bid, for 2-15 years in steps of 1 year, then for 20, 25 and 30 years. The mid swap rates for all of these lifetimes need to be calculated, and then the interpolations of mid swap rates for the lifetimes of 16-19, 21-24 and 26-29 years, using the 15, 20, 25 and 30 year rates respectively, would have to be done. These rates would be the source for the valuations for all synthetic swaps, and thus for the calculation of all indices.

On days where there is a business day in NY but not in UK, the LIBOR rates of the previous UK business day should be used unchanged.

One solution is that the index valuations could be performed using financial market software which can valuate IRS positions. The project software has a real-time interface which would use IRS semi bond quotes and LIBOR rates, and the real-time distribution of the index values too. The solution would need to be capable of holding synthetic IRS portfolios and calculating the standard output values described above.

The trade contents include: Trade date: The date on which the transaction occurs. Notional principal amount: The specific dollar amount on which the exchange of interest payments are based. Value date: The date on which the agreement takes effect. Maturity date: The duration of the IRS modified following. Spread to Treasury: The difference between the current US Treasury yield and the rate that banks charge each other for lines of credit. The price discrepancy is an indicator of credit risk. Treasury hedge: A treasury transaction made in order to reduce the risk of adverse price movements. Treasury hedge #1 and #2: When there is no current on-the-run Treasury for the IRS period, the treasury hedge is calculated using a combination of the adjacent current on-the-run treasury before and after the maturity date. Treasury price: Treasury price expressed as a percentage of par. Treasury price #1: Treasury price expressed as a percentage of par. Treasury price #2: Treasury price expressed as a percentage of par. Treasury yield: The coupon rate divided by the market price. Treasury yield #1: When there is no current on-the-run treasury for the period requiring the IRS, an interpolated yield is calculated using the adjacent current on-the-run treasury before and after the maturity date. Treasury yield #2: When there is no current on-the-run treasury for the period requiring the IRS, an interpolated yield is calculated using the adjacent current on-the-run treasury before and after the maturity date. Fixed rate: the rate that does not change for the duration of the IRS. Fixed rate interest rate calculation: The day count convention that specifies how to count the number of days between two dates, and how to calculate the length of an interest period when the period is smaller than a regular interest period. Fixed rate payable: The date on which the fixed rate is scheduled to become payable. Fixed rate payments dates: The actual date on which the fixed interest rate is paid. Floating rate: The interest rate that changes on a preset periodic basis for the duration of the IRS. First floating rate: The rate that applies to the first floating period. First floating rate set for period ending: The date for which the first floating rate is to be applied. Floating rate interest rate calculation: The day count convention that specifies how to count the number of days between two dates, and how to calculate the size of an interest period when the period is smaller than a regular interest period. Floating rate reset dates: The dates on which the floating rate is adjusted and reset. Floating rate payable: The dates on which the floating rate is scheduled to become payable. Floating rate payment dates: The date on which the floating interest rate is paid. Interest held and compounded: Interest which is calculated on the notional principal amount plus the accumulated interest of prior periods. Payment exchange: Payments of interest obligations based on the notional principle amount. Mutual put: A zero premium put option exchanged by both counterparties giving the right but not the obligation to excise the option at market at a predetermined date.

Rates fixed at index inception: At mid market 2-year, 3-year, 5-year, 10-year, and 30-year, current treasury yield.

Rates interpolated at mid market: 4-year, 6-year, 7-year, 8-year, 9-year, 13-year, 14-year, 15-year, 16-year, 17-year, 18-year, 19-year, 20-year, 21-year, 22-year, 23-year, 24-year, 25-year, 26-year, 27-year, 28-year and 29-year, current treasury yield. 11-year and 12-year trade use at mid market 10-year current treasury yield. At mid market spread to current treasury yield on the spot 2-year, 3-year, 4-year, 5-year, 6-year, 7-year, 8-year, 9-year, 10-year, 11-year, 12-year, 13-year, 14-year, 15-year, 16-year, 17-year, 18-year, 19-year, 20-year, 21-year, 22-year, 23-year, 24-year, 25-year, 26-year, 27-year, 28-year, 29-year, 30-year and spot 40-year.

3 month LIBOR may be used at index inception.

Rebalance dates: The date the United States Treasury new issue of the 2-year note, 3-year note, 5-year note, 10-year note, or 30-year bond trades current. The reopen of a current note or bond is not considered a rebalance event or date. Treasury bills and tips are excluded. Alternatively, the rebalance dates can be monthly on a particular day of the month, e.g. the second Wednesday of the month, or for shorter periods such as daily or multiple times per day.

Rebalance time: If monthly, this needs to be set. For example, 10:00 am Eastern United States.

Rates reset on rebalance dates: At mid market 2-year, 3-year, 5-year, 10-year, and 30-year current treasury yield. Interpolated at mid market 4-year, 6-year, 7-year, 8-year, 9-year, 13-year, 14-year, 15-year, 16-year, 17-year, 18-year, 19-year, 20-year, 21-year, 22-year, 23-year, 24-year, 25-year, 26-year, 27-year, 28-year, and 29-year current treasury yield. 11-year and 12-year trade use at mid market 10-year current treasury yield. IRS at mid market spread to current treasury yield on the spot 2-year, 3-year, 4-year, 5-year, 6-year, 7-year, 8-year, 9-year, 10-year, 11-year, 12-year, 13-year, 14-year, 15-year, 16-year, 17-year, 18-year, 19-year, 20-year, 21-year, 22-year, 23-year, 24-year, 25-year, 26-year, 27-year, 28-year, 29-year, 30-year and spot 40-year.

Spread to Treasury Reference Source: At inception: Current mid market, vendor spread to current treasury prices or market poll. At rebalance: Take the IRS index mid price, take out the mid old treasury yield, resulting in a synthetic mid spread to treasury plus or minus the treasury roll from the mid of the old issue to the mid of the new issue, reset at market mid spread to treasury 2-years thru 40-years.

End of day: For example, 5:00 pm Eastern United States.

IRS index Semi Bond Spread Trades can be for periods: 1a) 2-year×3-year; 1b) 2-year×5-year; 1c) 2-year×10-year; 1d) 2-year×30-year; 2a) 3-year×5-year; 2b) 3-year×10-year; 2c) 3-year×30-year; 3a) 5-year×10-year; 3b) 5-year×30-year; 4a) 10-year×30-year. The IRS spread requires two simultaneous trades, buying or selling the shorter period (short leg) whilst the reverse (selling or buying) the longer period (long leg). Purchasing the index reflects to buy the longer period. Note: "IRS spread" not to be confused with a spread to treasury or bid offer spread.

Short leg settings at origin: Trade date: Index origin date. Notional principal amount: Duration weight. Value date: 2 good business days (spot). Maturity date: The duration of the IRS. Treasury hedge: Current on-the-run. Treasury hedge amount: Determined at Rebalance. Fixed rate: At mid market current treasury yield, plus at mid market spread to treasury yield, semi bond. Spread to treasury: At mid market. Current treasury yield: At mid market. Current treasury price: At mid market. Fixed rate interest rate calculation: 30/360 adjusted bond basis. Fixed rate payable: Semi annual. Fixed rate payments dates: Semi annual. Floating rate: 3 month LIBOR. First floating rate: LIBOR. First floating rate set for period ending: 3 month LIBOR. Floating rate interest rate calculation: Actual/360. Floating rate reset: Quarterly. Floating rate payable: Quarterly. Floating rate payment dates: Quarterly. Floating rate held and compounded: No. Payment exchange: Net payment. Mutual put: No.

Reset at rebalance: Trade date: The day of the rebalance date. Notional principal amount: Duration weight. Value date: 2 good business days (spot). Maturity date: The duration of the IRS. Spread to treasury: At rebalance fixing. Treasury hedge: Current on-the-run. Treasury hedge amount: Determined at origin or rebalance. Treasury price: At mid market. Fixed rate: At mid current treasury yield, plus at spread to treasury yield fixing, semi bond. Fixed rate payments dates: Semi annual. Floating rate: 3 month LIBOR. First floating rate set for period ending: 3 month LIBOR. Floating rate payment dates: Quarterly.

Terms and conditions: Non business day: Modified following ISDA documentation, herein incorporated by reference. "ISDA" is the International Swaps and Derivatives Association which periodically publishes standards type publications used by the industry. Ref source for floating rate: Telerate page 3750, herein incorporated by reference. Ref source Spread to treasury: IRS Index. Ref source for treasury yield: Publicly available.

Conditions: ISDA documentation, herein incorporated by reference.

Long leg settings at origin: Trade date: Index origin date. Notional principal amount: 25 Million US Dollars. Value date: 2 good business days (spot). Maturity date: The duration of the IRS. Treasury hedge: Current on-the-run. Treasury hedge amount: Determined at origin or rebalance. Fixed rate: At mid market current treasury yield plus, at mid market spread to treasury yield, semi bond. Spread to treasury: At mid market. Treasury yield: At mid market. Treasury price: At mid market. Fixed rate interest rate calculation: 30/360 adjusted bond basis. Fixed rate payable: Semi annual. Fixed rate payments dates: Semi annual.

Floating rate: 3 month LIBOR. First floating rate: LIBOR. First floating rate set for period ending: 3 month LIBOR. Floating rate interest rate calculation: Actual/360. Floating rate reset: Quarterly. Floating rate payable: Quarterly. Floating rate payment dates: Quarterly. Floating rate held and compounded: No. Payment exchange: Net payment. Mutual put: No.

Reset at rebalance: Trade date: The day of the rebalance date. Value date: 2 good business days (spot). Maturity date: The duration of the IRS. Spread to treasury: At rebalance fixing. Treasury hedge: Current on-the-run. Treasury hedge amount: Determined at origin or rebalance. Treasury price: At mid market. Fixed rate: At mid current treasury yield, plus at spread to treasury yield fixing, semi bond. Fixed rate payments dates: Semi annual. Floating rate: 3 month LIBOR. First floating rate set for period ending: 3 month LIBOR. Floating rate payment dates: Quarterly.

Terms and conditions: Non business day: Modified following ISDA documentation, herein incorporated by reference. Ref source for floating rate: Telerate page 3750, herein incorporated by reference. Ref source Spread to treasury: IRS index. Ref source for Treasury yield: FTSE.

Conditions: ISDA documentation, herein incorporated by reference.

Note: It is standard market practice to apply the notional amount to the middle leg or body, with the wings being duration weighted.

IRS index, IRS Semi Bond Trades Periods: 2-year, 3-year, 5-year, 10-year, 11-year, 12-year, 30-year, 40-year. The index reflects to buy the swap.

Settings at origin: Trade date: Index origin date. Notional principal amount: 1 Million US Dollars. Value date: 2 good business days (spot). Maturity date: The duration of the IRS. Treasury hedge: Current on-the-run. Treasury hedge amount: Determined at origin or rebalance. Fixed rate: At mid market current treasury yield, plus market spread to treasury yield mid, semi bond. Spread to treasury: At mid market. Treasury price: At mid market. Treasury yield: At mid market. Fixed rate interest rate calculation: 30/360 adjusted bond basis. Fixed rate payable: Semi annual. Fixed rate payments dates: Semi annual.

Floating rate: 3 month LIBOR. First floating rate: LIBOR. First floating rate set for period ending: 3 month LIBOR. Floating rate interest rate calculation: Actual/360. Floating rate reset: Quarterly. Floating rate payable: Quarterly. Floating rate payment dates: Quarterly. Floating rate held and compounded: No. Payment exchange: Net payment. Mutual put: No.

Resets at rebalance: Trade date: The day of the rebalance date. Value date: 2 good business days (spot). Maturity date: The duration of the IRS. Spread to treasury: At rebalance fixing. Treasury hedge: Current on-the-run. Treasury yield: At mid market. Treasury price: At mid market. Fixed rate: At mid current treasury yield mid, plus at spread to yield fixing, semi bond. Fixed rate payments dates: Semi annual. Floating rate: 3 month LIBOR. First floating rate set for period ending: 3 month LIBOR. Fixed rate payments dates: Semi annual.

Terms and conditions: Non business day: ISDA documentation, herein incorporated by reference. Ref source Spread to treasury: IRS Index. Ref source for treasury yield: FTSE. Ref source for floating rate: Telerate page 3750, herein incorporated by reference.

Conditions: ISDA documentation, herein incorporated by reference.

Periods: 4-year, 6-year, 7-year, 8-year, 9-year, 13-year, 14-year, 15-year, 16-year, 17-year, 18-year, 19-year, 20-year, 21-year, 22-year, 23-year, 24-year, 25-year, 26-year, 27-year, 28-year, and 29-year. The index reflects to buy the swap.

Settings at origin: Trade date: Index origin date. Notional principal amount: 1 Million US Dollars. Value date: 2 good business days (spot). Maturity date: The duration of the IRS. Treasury hedge amount # 1: Determined at origin or rebalance. Treasury hedge amount # 2: Determined at origin or rebalance. Fixed rate: At mid market interpolated current treasury yield, plus at market spread to treasury, semi bond. Treasury price #1: At mid market. Treasury price #2: At mid market. Treasury yield #1: At mid market. Treasury yield #2: At mid market. Interpolated treasury yield: At market. Fixed rate interest rate calculation: 30/360 adjusted bond basis. Fixed rate payable: Semi annual. Fixed rate payments dates: Semi annual. Floating rate: 3 month LIBOR. First floating rate: LIBOR. First floating rate set for period ending: 3 month LIBOR. Floating rate interest rate calculation: Actual/360. Floating rate reset: Quarterly. Floating rate payable: Quarterly. Floating rate payment dates: Quarterly. Floating rate held and compounded: No. Payment exchange: Net payment. Mutual put: No.

Resets at rebalance: Trade date: The day of the rebalance date. Value date: 2 good business days (spot). Maturity date: The duration of the IRS. Spread to treasury: At rebalance fixing. Treasury hedge # 1: Determined at origin or rebalance. Treasury hedge # 2: Determined at origin or rebalance. Treasury price #1: At mid market. Treasury price #2: At mid market. Treasury yield #1: At mid market. Treasury yield #2: At mid market. Fixed rate: At mid current treasury yield fixing, plus at spread to yield fixing, semi bond. Fixed rate payments dates: Semi annual. Floating rate: 3 month LIBOR. First floating rate set for period ending: 3 month LIBOR. Fixed rate payments dates: Semi annual.

Terms and conditions: Non business day: ISDA documentation, herein incorporated by reference. Ref source Spread to treasury: IRS index. Ref source for treasury yield: FTSE. Ref source for floating rate: Telerate page 3750, herein incorporated by reference.

Conditions: ISDA documentation, herein incorporated by reference.

When there is no current treasury for the IRS period, an interpolated yield is calculated using the closest current treasury before and after the maturity date.

The medium term IRS market realigns the spread to treasury instantly by adjusting the spread to treasury to accommodate for the roll between the old and new issues, this practice results in zero price discrepancy in the medium term IRS semi bond market rates. When the market rolls from the old issue to the new, the IRS index rebalance emulates this market practice precisely, and will result in a zero price discrepancy in the IRS index. Hence forth it is entirely reasonable that the index itself can establish the rebalancing spread to treasury in establishing the current spread to treasury by reverse calculating the IRS index price and adjusting the resulting synthetic spread to treasury to accommodate for the roll creating independence from third party vendors. The rebalance is in place in order maintain the rudiments of the index perfectly inline with the spot IRS market. This will enable to set the index at any time they see fit.

When there is no current treasury for the IRS period, the treasury hedge amount is calculated using a combination of the closest current on-the-run treasury before and after the maturity date.

These IRS indices have been described as accommodating the US Dollar IRS market for purposes of exemplary convenience. However, they can be applied to any currency and even to multiple currencies in a single index. Adjustments in the IRS index can be made in order to reflect any countries debt policies. Put another way, calculation of the IRS index disclosed herein is possible as long as the data regarding the underlying curves is available for the asset in question.

On the index price page show the interpolated spread to treasury as the price changes in the index this will not correlate with the index prices because the treasury yield is always also changing. The index may be reverse priced to show treasury yield. It can be traded that way by trading the index and USD swap spread only. A synthetically created treasury yield can also be created and, if this yield is different to the current yield, the two products may be arbitraged. Also, the same can be done with the spreads if the treasury yield is taken out and the spread differs; the spread in both can be traded to arbitrage them.

Example of Set of Ground Rules for Managing Indices

Ground Rule 1:
1.1 The Index Series
1.1.1 The Index Series US Dollar Indices is a series of swaps indices covering the principal interest rate swaps markets.

1.1.2 The series consists of four interest rate swaps indices: Index Series US Dollar Indices, Index Series Euro Indices, Index Series Yen Indices, Index Series Sterling Indices.

1.2 These Ground Rules 1.2.1 These Ground Rules for the management of the Index Series US Dollar Indices.

1.2.2 Further versions of these ground rules could define the specific details for the Euro, Yen, and Sterling Swaps Indices.

1.3 Index Series Objectives 1.3.1 The objective is to create and maintain a series of indices for the international swaps markets for use as a benchmark and a trading vehicle by the global investment community. To achieve this, we have sought to establish the Index Series as being: Comprehensive, Consistent, Flexible, Accurate, Investable, Transparent, Predictable, Representative, User-driven 1.4 Indices 1.4.1 All Index Series US Dollar Indices are calculated as real-time indices and fixed at the end of the US business day however a fixing will be taken at 14:00 GMT for history building purposes.

1.4.2 The Index Series US Dollar Indices has the following indices: Interest Rate Swaps—29 Indices: 2-30 year swaps; Swaps Spreads—10 Indices: combinations of benchmark lifetimes (i.e. 2, 3, 5 10, 30); and Butterfly Swaps—6 Indices: combinations of benchmark lifetimes (e.g. 2×3×10).

1.5.1 Index Series US Dollar Indices consist of the main swap terms (i.e. 2-30 years) and Swap and Butterfly Indices for the benchmark lifetimes.

For better understanding of the index, some aspects on the main underlying structure of the USD swap market are: The USD IRS market is defined in relation to the standard on-the-run US Treasury bonds. These benchmark bonds have lifetimes of (at issue time) 2, 3, 5, 10 and 30 years. IRS rates are defined as a result of spreads quoted versus US Treasury benchmark bond mid yields versus the benchmark lifetimes of 2, 3, 5, 10 and 30 years, and using interpolations for the non-benchmark lifetimes. For Index Series US Dollar Indices, the "Semi Bond" standard USD IRS day count convention is used: Fixed rate paid 30/360 semi-annually modified following (UK business days) and floating rate 3-month LIBOR act/360 quarterly modified following (UK business days)

1.6 Index Methodology 1.6.1 All indices are based on swaps that follow the standard IRS day count convention in the respective market. All indices are calculated using mid swap rates, the bid and offer differences are not taken into account. Start of the daily valuations are 09:00 CET=08:00 UK. There is a daily fixing of the index values for index history building purposes, at 10:00 NY=16:00 CET=15:00 UK. The end of the daily valuations is 17:00 NY=23:00 CET=22:00 UK.

Notional amounts: Since all indices have started with an index value of 100.0, there is no need to officially use a certain notional amount. Every index value can be converted in any nominal amount by multiplication. For the calculation of the indices reflecting Spread Trades and Butterfly Trades however, certain adjustment to the notional amounts need to be undertaken. Spread trades: The notional amount of the long leg (which is bought into the index) is set to 25 million USD. The notional amount of the short leg (which is sold into the index) is adjusted so that the basis point value of the short leg, at the start of the index, or at rebalancing time respectively, (see Rebalancing the Indices below) shall be the same as the basis point value of the long leg. The notional amount of the short leg is rounded to the nearest 0.5 million USD. Butterfly trades: The notional amount of the body (which is bought into the index) shall be set to 25 million USD. The body shall be considered being divided into two parts of 12.5 million USD each. The notional amounts of each of the wings (which are sold into the index) is adjusted so that its basis point value, at the start of the index, or at rebalancing time respectively (see Rebalancing the Indices below), shall be the same as the basis point value of the half body. The notional amount of the adjusted legs is rounded to the nearest 0.5 million USD.

Index Data to Publish: The index values start with 100.0 so that a change by 1 would result in an index value of 101.0 or 99.0 respectively. The index figures can be considered synthetic.

Ground Rule 2

2.1 Price Sources 2.1.1 Input Data Sources

All calculations are performed using quoted IRS Semi Bond Swap rates, plus standard USD LIBOR rates (Telerate page: 3750) which are used as the source for interpolations (LIBOR for 1, 2, 3, 6 months and 1 year). The source for IRS Semi Bond Swap rates is the rates displayed on Reuters, where there are quotes available for both offer and bid, for 2-15 years in steps of 1 year, then for 20, 25 and 30 years. Initially the mid swap rates for all these lifetimes are calculated, and then the interpolations of mid swap rates for the lifetimes of 16-19, 21-24 and 26-29 years, using the 15, 20, 25 and 30 year rates respectively are calculated. These rates are the source for the valuations for all synthetic swaps, and thus for the calculation of all indices.

On days where there is a business day in NY but not in UK, the LIBOR rates of the previous UK business day are used unchanged.

Ground Rule 3

3.1 Rebalancing the Indices 3.1.1 All Index Series US Dollar Indices are rebalanced every month on the second Wednesday of the month. To avoid cashflows paid out from the synthetic swap positions, all IRS trades are sold and newly bought synthetically once every month. This rebalancing also avoids the shortening of lifetimes of all positions which at beginning are full years, so that they can not become less than the respective years (e.g. 1+11 months). To avoid deferrals resulting from holidays or weekends, the monthly rebalancing is always done on the second Wednesday of every month. The rebalancing procedures, which include the recalculation of notional amounts for Spread and Butterfly Trades Indices, shall take place on this day at 10.00 NY=16:00 CET=15:00 UK.

3.2 Settings at Origin and Resets at Rebalance 3.2.1 Interest Rate Swaps Semi Bond Trades Periods:

2-year, 3-year, 5-year, 10-year, 11-year, 12-year, 30-year, 40-year. The index reflects to buy the swap.

Settings at Origin:

1. Trade date: Index origin date.
2. Notional principal amount: 1 Million US Dollars.
3. Value date: 2 good business days (spot).
4. Maturity date: The duration of the Interest Rate Swap.
5. Treasury hedge: Current on-the-run.
6. Treasury hedge amount: Determined at Rebalance.
7. Fixed rate: At mid market current treasury yield, plus at mid market interest rate swap.
   spread to current treasury yield, semi bond.
8. Interest rate swap Spread to current treasury yield: At mid market.
9. Treasury price: At mid market.
10. Treasury yield: At mid market.

11. Fixed rate interest rate calculation: 30/360 adjusted bond basis.
12. Fixed rate payable: Semi annual.
13. Fixed rate payments dates: Semi annual.
14. Floating rate: 3 month LIBOR.
15. First floating rate: LIBOR.
16. First floating rate set for period ending: 3 month LIBOR.
17. Floating rate interest rate calculation: Actual/360.
18. Floating rate reset: Quarterly.
19. Floating rate payable: Quarterly.
20. Floating rate payment dates: Quarterly.
21. Floating rate held and compounded: No.
22. Payment exchange: Net payment.
23. Mutual put: No.
Resets at Rebalance:
24. Trade date: The day of the rebalance date.
25. Value date: 2 good business days (spot).
26. Maturity date: The duration of the IRS.
27. Interest Rate Swap spread to current treasury yield: At mid market.
28. Treasury hedge: current on the run.
29. Treasury hedge amount: Determined at Rebalance.
30. Treasury yield: At mid market.
31. Treasury price: At mid market.
32. Fixed rate: At mid market current treasury yield, plus at mid market interest rate swap.spread to current treasury yield semi bond.
33. Fixed rate payments dates: Semi annual.
34. Floating rate: 3 month LIBOR.
35. First floating rate set for period ending: 3 month LIBOR.
36. Fixed rate payments dates: Semi annual.
Terms and Conditions:
37. Non business day: ISDA documentation.
38. Ref source for interest rate swap spread to current treasury yield: Reuters.
39. Ref source for treasury yield: FTSE.
40. Ref source for floating rate: Telerate page 3750.
41. Conditions: ISDA documentation.
Periods:
4-year, 6-year, 7-year, 8-year, 9-year, 13-year, 14-year, 15-year, 16-year, 17-year, 18-year, 19-year,
20-year, 21-year, 22-year, 23-year, 24-year, 25-year, 26-year, 27-year, 28-year, and 29-year. The index reflects to buy the swap.
Settings at Origin:
1. Trade date: Index origin date.
2. Notional principal amount: 1 Million US Dollars.
3. Value date: 2 good business days (spot).
4. Maturity date: The duration of the Interest Rate Swap.
5. Treasury hedge amount # 1: Determined at Rebalance.
6. Treasury hedge amount # 2: Determined at Rebalance.
7. Fixed rate: At mid market interpolated current treasury yield, plus at mid market interest rate swap spread to current treasury yield semi bond.
8. Treasury price #1: At mid market.
9. Treasury price #2: At mid market.
10. Treasury yield #1: At mid market.
11. Treasury yield #2: At mid market.
12. Interpolated treasury yield: At mid market.
13. Interest rate swap spread to current treasury yield: at mid market.
14. Fixed rate interest rate calculation: 30/360 adjusted bond basis.
15. Fixed rate payable: Semi annual.
16. Fixed rate payments dates: Semi annual.
17. Floating rate: 3 month LIBOR.
18. First floating rate: LIBOR.
19. First floating rate set for period ending: 3 month LIBOR.
20. Floating rate interest rate calculation: Actual/360.
21. Floating rate reset: Quarterly.
22. Floating rate payable: Quarterly.
23. Floating rate payment dates: Quarterly.
24. Floating rate held and compounded: No.
25. Payment exchange: Net payment.
26. Mutual put: No.
Resets at Rebalance:
27. Trade date: The day of the rebalance date.
28. Value date: 2 good business days (spot).
29. Maturity date: The duration of the IRS.
30. Interest rate swap spread to current treasury yield: At mid market.
31. Treasury hedge amount # 1: Determined at rebalance.
32. Treasury hedge amount # 2: Determined at Rebalance.
33. Treasury hedge # 1: Current on the run.
34. Treasury hedge # 2: Current on the run.
35. Treasury price #1: At mid market.
36. Treasury price #2: At mid market.
37. Treasury yield #1: At mid market.
38. Treasury yield #2: At mid market.
39. Fixed rate: At mid market current treasury yield, plus at mid market interest rate swap spread to current treasury yield, semi bond.
40. Fixed rate payments dates: Semi annual.
41. Floating rate: 3 month LIBOR.
42. First floating rate set for period ending: 3 month LIBOR.
43. Fixed rate payments dates: Semi annual.
Terms and Conditions:
44. Non business day: ISDA documentation.
45. Ref source for interest rate swap spread to current treasury yield: Reuters.
46. Ref source for treasury yield: FTSE.
47. Ref source for floating rate: Telerate page 3750.
48. Conditions: ISDA documentation.
49. When there is no current treasury for the IRS period, an interpolated yield is calculated using the closest current treasury before and after the maturity date.
50. When there is no current treasury for the IRS period, the treasury hedge amount is calculated using a combination of the closest current on the run treasury before and after the maturity date.
3.2.2 Semi Bond Spread Trades
Periods:
1. 1a) 2-year×3-year. 1b) 2-year×5-year. 1c) 2-year×10-year.
1d) 2-year×30-year.
2. 2a) 3-year×5-year. 2b) 3-year×10-year. 2c) 3-year×30-year.
3. 3a) 5-year×10-year. 3b) 5-year×30-year.
4. 4a) 10-year×30-year.
The IRS spread requires two simultaneous trades buying or selling the shorter period (short leg), whilst trading the reverse selling or buying the longer period (long Leg). The index reflects to buy the longer period.
Note: not to be confused with a spread to treasury or bid offer spread.
Short Leg Settings at Origin:
1. Trade date: Index origin date.
2. Notional principal amount: Duration weight.
3. Value date: 2 good business days (spot).
4. Maturity date: The duration of the Interest Rate Swap.

5. Treasury hedge: Current on-the-run.
6. Treasury hedge amount: Determined at Rebalance.
7. Fixed rate: At mid market current treasury yield, plus at mid market interest rate swap
   spread to current treasury yield, semi bond.
8. Interest rate swap spread to current treasury yield: At mid market.
9. Current treasury yield: At mid market.
10. Current treasury price: At mid market.
11. Fixed rate interest rate calculation: 30/360 adjusted bond basis.
12. Fixed rate payable: Semi annual.
13. Fixed rate payments dates: Semi annual.
14. Floating rate: 3 month LIBOR.
15. First floating rate: LIBOR.
16. First floating rate set for period ending: 3 month LIBOR.
17. Floating rate interest rate calculation: Actual/360.
18. Floating rate reset: Quarterly.
19. Floating rate payable: Quarterly.
20. Floating rate payment dates: Quarterly.
21. Floating rate held and compounded: No.
22. Payment exchange: Net payment.
23. Mutual put: No.
Reset at Rebalance:
24. Trade date: The day of the rebalance date.
25. Notional principal amount: Duration weight.
26. Value date: 2 good business days (spot).
27. Maturity date: The duration of the IRS.
28. Interest rate swap spread to current treasury yield: At mid market.
29. Treasury hedge: Current on-the-run.
30. Treasury hedge amount: Determined at Rebalance.
31. Treasury price: At mid market
32. Fixed rate: At mid market current treasury yield, plus at mid market interest rate swap
   spread to current treasury yield, semi bond
33. Fixed rate payments dates: Semi annual.
34. Floating rate: 3 month LIBOR.
35. First floating rate set for period ending: 3 month LIBOR.
36. Floating rate payment dates: Quarterly.
Terms and Conditions:
37. Non business day: Modified following ISDA documentation.
38. Ref source for floating rate: Telerate page 3750.
39. Ref source for interest rate swap spread to current treasury yield: Reuters.
40. Ref source for treasury yield: FTSE.
41. Conditions: ISDA documentation.
Long Leg Settings at Origin:
1. Trade date: Index origin date.
2. Notional principal amount: 25 Million US Dollars.
3. Value date: 2 good business days (spot).
4. Maturity date: The duration of the Interest Rate Swap.
5. Treasury hedge: Current on-the-run.
6. Treasury hedge amount: Determined at Rebalance.
7. Fixed rate: At mid market current treasury yield, plus at mid market interest rate swap
   spread to treasury yield, semi bond.
8. Interest rate swap spread to current treasury yield: At mid market.
9. Treasury yield: At mid market.
10. Treasury price: At mid market.
11. Fixed rate interest rate calculation: 30/360 adjusted bond basis.
12. Fixed rate payable: Semi annual.
13. Fixed rate payments dates: Semi annual.
14. Floating rate: 3 month LIBOR.
15. First floating rate: LIBOR.
16. First floating rate set for period ending: 3 month LIBOR.
17. Floating rate interest rate calculation: Actual/360.
18. Floating rate reset: Quarterly.
19. Floating rate payable: Quarterly.
20. Floating rate payment dates: Quarterly.
21. Floating rate held and compounded: No.
22. Payment exchange: Net payment.
23. Mutual put: No.
Reset at Rebalance:
24. Trade date: The day of the rebalance date.
25. Value date: 2 good business days (spot).
26. Maturity date: The duration of the IRS.
27. Interest rate swap spread to current treasury yield: At mid market.
28. Treasury hedge: Current on-the-run.
29. Treasury hedge amount: Determined at Rebalance.
30. Treasury price: At mid market.
31. Fixed rate: At mid market current treasury yield, plus at mid market interest rate swap
   spread to current treasury yield, semi bond.
32. Fixed rate payments dates: Semi annual.
33. Floating rate: 3 month LIBOR.
34. First floating rate set for period ending: 3 month LIBOR.
35. Floating rate payment dates: Quarterly.
Terms and Conditions:
36. Non business day: ISDA documentation.
37. Ref source for interest rate swap spread to current treasury yield: Reuters.
38. Ref source for treasury yield: FTSE.
39. Ref source for floating rate: Telerate page 3750.
40. Conditions: ISDA documentation.
Note: It is standard market practice to apply the notional principle amount to the longer leg with the short leg being duration weighted.

3.2.3 Semi Bond Butterfly Trades
Periods:
1. 1a) 2-year×3-year×5-year. 1b) 2-year×5-year×10-year. 1c) 2-year×10-year×30-year.
2. 2a) 3-year×5-year×10-year. 2b) 3-year×10-year×30-year.
3. 3a) 5-year×10-year×30-year.

The IRS butterfly requires three simultaneous trades buying or selling the shorter period and longer period, (the wings) whilst trading in the opposite direction, selling or buying the middle period (the body). The index reflects to buy the body and sell the wings.

Short Wing Settings at Origin:
1. Trade date: Index origin date.
2. Notional principal amount: Duration weight.
3. Value date: 2 good business days (spot).
4. Maturity date: The duration of the Interest Rate Swap.
5. Treasury hedge: Current on-the-run.
6. Treasury hedge amount: Determined at Rebalance.
7. Fixed rate: At mid market current treasury yield, plus at mid interest rate swap market
   spread to current treasury yield, semi bond.
8. Interest rate swap spread to current treasury yield: At mid market.
9. Treasury yield: At mid market.
10. Treasury price: At mid market.
11. Fixed rate interest rate calculation: 30/360 adjusted bond basis.

12. Fixed rate payable: Semi annual.
13. Fixed rate payments dates: Semi annual.
14. Floating rate: 3 month LIBOR.
15. First floating rate: LIBOR.
16. First floating rate set for period ending: 3 month LIBOR.
17. Floating rate interest rate calculation: Actual/360.
18. Floating rate reset: Quarterly.
19. Floating rate payable: Quarterly.
20. Floating rate payment dates: Quarterly.
21. Floating rate held and compounded: No.
22. Payment exchange: Net payment.
23. Mutual put: No.
Reset at Rebalance:
24. Trade date: The day of the rebalance date.
25. Notional principal amount: Duration weight.
26. Value date: 2 good business days (spot).
27. Maturity date: The duration of the IRS.
28. Spread to treasury yield: At market.
29. Treasury hedge: Current on-the-run.
30. Treasury hedge amount: Determined at Rebalance.
31. Treasury price: At mid market.
32. Fixed rate: At mid market current treasury yield, plus at mid market interest rate swap spread to current treasury yield, semi bond.
33. Fixed rate payments dates: Semi annual.
34. Floating rate: 3 month LIBOR.
35. First floating rate set for period ending: 3 month LIBOR.
36. Floating rate payment dates: Quarterly.
Terms and Conditions:
37. Non business day: Modified following ISDA documentation.
38. Ref source for floating rate: Telerate page 3750.
39. Ref source for interest rate swap spread to current treasury yield: Reuters.
40. Ref source for treasury yield: FTSE.
41. Conditions: ISDA documentation.
Body Settings at Origin:
1. Trade date: Index origin date.
2. Notional principal amount: 25 Million US Dollars.
3. Value date: 2 good business days (spot).
4. Maturity date: The duration of the Interest Rate Swap.
5. Treasury hedge: Current on-the-run.
6. Treasury hedge amount: Determined at Rebalance.
7. Fixed rate: At mid market current treasury yield, plus at mid market interest rate swap spread to current treasury yield, semi bond.
8. Interest rate swap spread to current treasury yield: At mid market.
9. Treasury yield: At mid market.
10. Treasury price: At mid market.
11. Fixed rate interest rate calculation: 30/360 adjusted bond basis.
12. Fixed rate payable: Semi annual.
13. Fixed rate payments dates: Semi annual.
14. Floating rate: 3 month LIBOR.
15. First floating rate: LIBOR.
16. First floating rate set for period ending: 3 month LIBOR.
17. Floating rate interest rate calculation: Actual/360.
18. Floating rate reset: Quarterly.
19. Floating rate payable: Quarterly.
20. Floating rate payment dates: Quarterly.
21. Floating rate held and compounded: No.
22. Payment exchange: Net payment.
23. Mutual put: No.
Reset at Rebalance:
24. Trade date: The day of the rebalance date.
25. Value date: 2 good business days (spot).
26. Maturity date: The duration of the IRS.
27. Interest rate swap spread to current treasury yield: At mid market.
28. Treasury hedge: Current on-the-run.
29. Treasury hedge amount: Determined at Rebalance.
30. Treasury price: At mid market.
31. Fixed rate: At mid market current treasury yield, plus at mid market interest rate swap spread to current treasury yield, semi bond.
32. Fixed rate payments dates: Semi annual.
33. Floating rate: 3 month LIBOR.
34. First floating rate set for period ending: 3 month LIBOR.
35. Floating rate payment dates: Quarterly.
Terms and Conditions:
36. Non business day: ISDA documentation.
37. Ref source for interest rate swap spread to current treasury yield: Reuters.
38. Ref source for treasury yield: FTSE.
39. Ref source for floating rate: Telerate page 3750.
40. Conditions: ISDA documentation.
Long Wing Settings at Origin:
1. Trade date: Index origin date.
2. Notional principal amount: Duration weight.
3. Value date: 2 good business days (spot).
4. Maturity date: The duration of the Interest Rate Swap.
5. Treasury hedge: Current on-the-run.
6. Treasury hedge amount: Determined at Rebalance.
7. Fixed rate: At mid market current treasury yield, plus at mid market interest rate swap spread to current treasury yield, semi bond.
8. Interest rate swap spread to current treasury yield: At mid market.
9. Treasury yield: At mid market.
10. Treasury price: At mid market.
11. Fixed rate interest rate calculation: 30/360 adjusted bond basis.
12. Fixed rate payable: Semi annual.
13. Fixed rate payments dates: Semi annual modified following.
14. Floating rate: 3 month LIBOR.
15. First floating rate: LIBOR.
16. First floating rate set for period ending: 3 month LIBOR.
17. Floating rate interest rate calculation: Actual/360.
18. Floating rate reset: Quarterly.
19. Floating rate payable: Quarterly.
20. Floating rate payment dates: Quarterly.
21. Floating rate held and compounded: No.
22. Payment exchange: Net payment.
23. Mutual put: No.
Reset at Rebalance:
24. Trade date: The day of the rebalance date.
25. Notional principal amount: Duration weight.
26. Value date: 2 good business days (spot).
27. Maturity date: The duration of the IRS.
28. Interest rate swap spread to current treasury yield: At mid market.
29. Treasury hedge: Current on-the-run.
30. Treasury hedge amount: Determined at Rebalance.
31. Treasury price: At mid market.
32. Fixed rate: At mid market current treasury yield, plus at mid market interest rate swap spread to current treasury yield, semi bond.

33. Fixed rate payments dates: Semi annual.
34. Floating rate: 3 month LIBOR.
35. First floating rate set for period ending: 3 month LIBOR.
36. Floating rate payment dates: Quarterly.
Terms and Conditions:
37. Non business day: Modified following ISDA documentation.
38. Ref source for floating rate: Telerate page 3750.
39. Ref source for interest rate swap spread to current treasury yield: Reuters.
40. Ref source for Treasury yield: FTSE.
41. Conditions: ISDA documentation.

Note: It is standard market practice to apply the notional amount to the middle leg or body, with the wings being duration weighted.

Ground Rule 4 (Amendments and Exceptions)

4.1 In the event that the Bond Index Committee responsible for the operation and administration of the Index Series US Dollar Indices consider that a change of principle or exceptions should be made to any of the Ground Rules, the issue must be brought to the attention of the Chairman or Deputy Chairman of the Bond Index Committee, who will normally put the matter to the full Bond Index Committee for a decision.

4.2 If, however, the matter is urgent, the Chairman and Deputy Chairman (or their deputies) are collectively empowered to authorise an exception on behalf of the Bond Index Committee but must immediately notify, and subsequently refer the matter to a meeting of the Bond Index Committee. Where an exception is granted to the Ground Rules under Rule 4.1, it shall not be deemed to create a precedent for future decisions of the Bond Index Committee.

Thus, a set of indices which accurately reflect the needs of IRS traders has been created and described herein. The IRS traders who wish to capture the medium term swap yield curve, this can be done as steepeners or flatteners, may use this set of indices to their advantage in many ways.

In view of the above, it will be seen that the several advantages of the invention are achieved and other advantages attained. The invention is not restricted to the above-described embodiments which can be varied in a number of ways within the scope of the invention. As various changes could be made in the above index, derivatives, financial instruments and methods without departing from the scope of the invention, it is intended that all matter contained in the above description and shown in the accompanying drawings shall be interpreted as illustrative and not in a limiting sense.

I claim:

1. A computer implemented method for determining a derivative financial instrument value comprising the steps of:
   a. setting a starting value of an index for a synthetic interest rate swap having at least two legs and underlying a derivative financial instrument;
   b. calculating with the computer an index present value at least every business day by using data from at least one real-time market data providing environment for input to financial services software on the computer, including calculating a present value for each leg of the synthetic interest rate swap by determining all future payments for each leg utilizing mark to market accounting and a zero coupon bond yield curve, the present value of at least one leg of the synthetic interest rate swap determined utilizing at least one variable parameter from the real-time market data providing environment;
   c. rebalancing the index at a predetermined frequency with the computer by synthetically selling the synthetic interest rate swap, immediately synthetically rebuying the synthetic interest rate swap;
   d. multiplying a notional value of the derivative financial instrument by the index present value; and
   e. distributing at least one of the index present value or the derivative financial instrument value to owners of the derivative financial instrument via a communication interface.

2. The method of claim 1 wherein:
   a. the at least one variable parameter is a variable rate of interest determined from a bond quote from the real-time market data providing environment.

3. The method of claim 1 further comprising:
   a. providing an ability to buy and sell the derivative financial instrument, the ability to buy and sell provided by a single counterparty.

4. The method of claim 3 wherein the step of calculating the index present value further comprising:
   a. synthetically selling and synthetically buying the at least two legs of the synthetic interest rate swap.

5. The method of claim 4 further wherein the step of performing, periodically, a mark to market valuation has a frequency of greater than every hour of every business day.

6. The method of claim 1 wherein calculating the index present value further comprising the step of:
   a. discounting each of the synthetic interest rate swap by the zero coupon bond yield curve.

7. The method of claim 1 wherein the at least one variable parameter changes constantly during at least a portion of the business day and the index present value is calculated in real-time along with changes in the at least one variable parameter.

8. A computer implemented method for determining a derivative financial instrument value comprising the steps of:
   a. executing on a trade date at least one of a purchase or a sale of a derivative financial instrument;
   b. determining a starting value of an index for a synthetic interest rate swap having at least two legs and underlying the derivative financial instrument, the starting value determined relative to the trade date;
   c. receiving with a computer via a communication interface a present value of the index calculated at least every business day with;
      i. data for input to financial services software from at least one real-time market data environment including at least one variable parameter;
      ii. a present value for each leg of the synthetic interest rate swap determined as net of all future payments for each leg calculated with mark to market accounting and a zero coupon bond yield curve; and
      iii. a rebalance of the index at a predetermined frequency by a synthetic sale of the synthetic interest rate swap and an immediate synthetic repurchase of the synthetic interest rate swap;
   d. multiplying a notional value of the derivative financial instrument by the present value of the index received by the computer; and
   e. calculating with the computer the derivative financial instrument value by subtracting the starting value from the notional value multiplied by the index present value.

9. The method of claim 8 wherein:
   a. the variable parameter is a variable rate of interest determined from a bond quote from the market data environment.

10. The method of claim 8 further comprising the step of:
    a. providing an ability to buy and an ability to sell the derivative financial instrument, the ability to buy and ability to sell the derivative financial instrument provided by a single counterparty.

11. The method of claim 10 wherein the index present value is calculated by synthetically selling and synthetically buying the legs of the interest rate swap.

12. The method of claim 11 further wherein the mark to market accounting has a frequency of greater than every hour of every business day.

13. The method of claim 8 wherein calculating the present value further comprising the step of:
   a. discounting each leg of the interest rate swap by the zero coupon bond yield curve.

14. The method of claim 8 wherein the at least one variable parameter changes constantly during at least a portion of the business day and the present value is calculated in real-time along with the variable parameter changes.

15. A computer implemented method for creation and valuation of a derivative financial instrument comprising the steps of:
   a. creating with a computer the derivative financial instrument having a notional value and underlain by a synthetic interest rate swap having at least two legs;
   b. relating with the computer a starting value of the derivative financial instrument to an index for the synthetic interest rate swap, the index varying over time and calculated at least every business day with data from at least one real-time market data environment for input to financial services software;
      i. the index determined from future payments for each leg calculated by mark to market accounting and a zero coupon bond yield curve, the future payments of at least one leg of the synthetic interest rate swap determined from at least one variable parameter from the at least one real-time market data environment,
      ii. the index rebalanced at a predetermined frequency by a synthetic sale of the synthetic interest rate swap and an immediate synthetic repurchase of the synthetic interest rate swap;
   c. calculating with the computer a preliminary value of the derivative financial instrument by multiplying the notional value of the financial instrument by the index;
   d. determining a final value of the derivative financial instrument by reducing the preliminary value by the starting value.

16. The method of claim 15 wherein:
   a. the variable parameter is a variable rate of interest determined from a bond quote from the market data providing environment.

17. The method of claim 15 further comprising the step of:
   a. providing an ability to buy and sell the derivative financial instrument, the ability to buy and sell provided by a single counterparty.

18. The method of claim 17 wherein the index is calculated by synthetically selling and synthetically buying the legs of the synthetic interest rate swap.

19. The method of claim 17 further wherein the mark to market valuation has a frequency of greater than every hour of every business day.

20. The method of claim 17 further comprising discounting each leg of the interest rate swap by the zero coupon bond yield curve.

21. The method of claim 17 wherein the at least one variable parameter changes constantly during at least a portion of the business day and the present value is calculated in real-time along with the at least one variable parameter changes.

* * * * *